(12) United States Patent  
Moriyama et al.

(10) Patent No.: US 7,688,496 B2
(45) Date of Patent: Mar. 30, 2010

(54) DISPLAY MEDIUM, DISPLAY DEVICE AND DISPLAY METHOD

(75) Inventors: Hiroaki Moriyama, Kanagawa (JP); Yasuo Yamamoto, Kanagawa (JP); Jun Kawahara, Kanagawa (JP); Masaaki Abe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 972 days.

(21) Appl. No.: 11/438,743

(22) Filed: May 22, 2006

(65) Prior Publication Data

US 2007/0120814 A1  May 31, 2007

(30) Foreign Application Priority Data

Nov. 25, 2005 (JP) .............................. 2005-340093

(51) Int. Cl.  
    *G02B 26/00* (2006.01)
(52) U.S. Cl. ....................................... 359/296; 345/107
(58) Field of Classification Search ................. 359/296, 359/529, 530, 536; 345/107  
See application file for complete search history.

(56) References Cited

U.S. PATENT DOCUMENTS

| 6,017,584 | A | 1/2000 | Albert et al. |
| 6,323,989 | B1 * | 11/2001 | Jacobson et al. ............ 359/296 |
| 6,545,797 | B2 | 4/2003 | Chen et al. |
| 6,672,921 | B1 | 1/2004 | Liang et al. |
| 6,751,007 | B2 | 6/2004 | Liang et al. |
| 6,751,008 | B2 | 6/2004 | Liang et al. |
| 6,788,449 | B2 | 9/2004 | Liang et al. |
| 6,788,452 | B2 | 9/2004 | Liang et al. |
| 6,795,229 | B2 | 9/2004 | Liang et al. |
| 6,829,078 | B2 | 12/2004 | Liang et al. |
| 6,831,770 | B2 | 12/2004 | Liang et al. |
| 6,833,943 | B2 | 12/2004 | Liang et al. |
| 6,859,302 | B2 | 2/2005 | Liang et al. |
| 6,865,012 | B2 | 3/2005 | Liang et al. |
| 6,867,898 | B2 | 3/2005 | Liang et al. |
| 6,885,495 | B2 | 4/2005 | Liang et al. |
| 7,224,511 | B2 * | 5/2007 | Takagi ......................... 359/296 |
| 7,250,933 | B2 * | 7/2007 | De Boer et al. ............. 345/107 |
| 7,283,119 | B2 * | 10/2007 | Kishi ........................... 345/107 |
| 7,397,597 | B2 * | 7/2008 | Verschueren et al. ......... 359/296 |

FOREIGN PATENT DOCUMENTS

| JP | 11-076800 | 3/1999 |
| JP | 2000-035598 | 2/2000 |

(Continued)

*Primary Examiner*—Timothy J Thompson  
(74) *Attorney, Agent, or Firm*—Fildes & Outland, P.C.

(57) ABSTRACT

The invention provides a display medium having a dimmer layer which comprises at least two kinds of charged mobile fine particles. Each of the at least two kinds of the charged mobile fine particles respectively has different coloration and a different mobility, and the charged mobile fine particles of at least one kind of the at least two kinds show coloration when in a dispersed state. The invention further provides a display device having an electric field forming unit and the dimmer layer. The invention further provides a display method which uses the display medium and includes putting the charged mobile fine particles of at least one of the kinds being dispersed while having other charged mobile fine particles not being dispersed.

23 Claims, 4 Drawing Sheets

FOREIGN PATENT DOCUMENTS

| | | |
|---|---|---|
| JP | 2000-322004 | 11/2000 |
| JP | 2002-333643 | 11/2002 |
| JP | 2004-020818 | 1/2004 |
| JP | 2004-522180 | 7/2004 |
| WO | 02/057843 | 7/2002 |
| WO | 2004-088409 | 10/2004 |

\* cited by examiner

FIG. 1
FIG. 1A
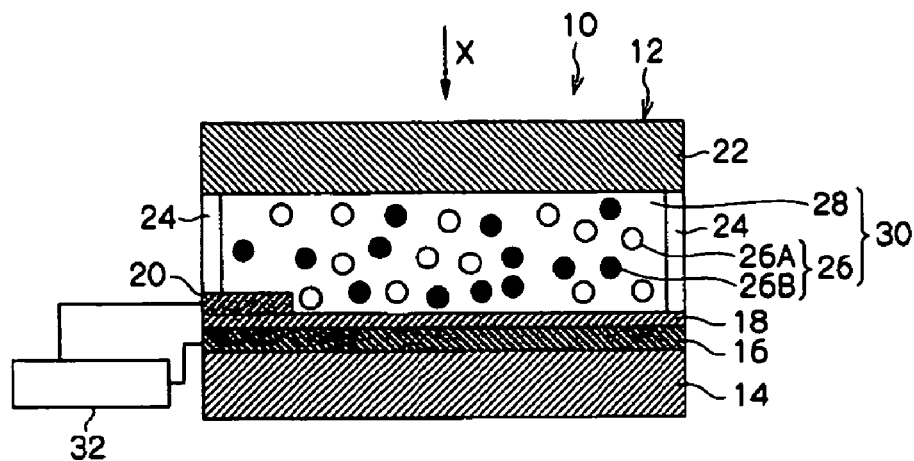
FIG. 1B
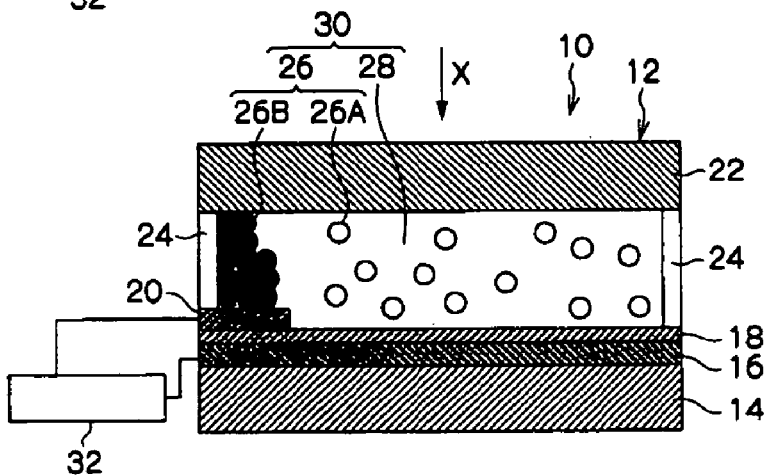
FIG. 1C
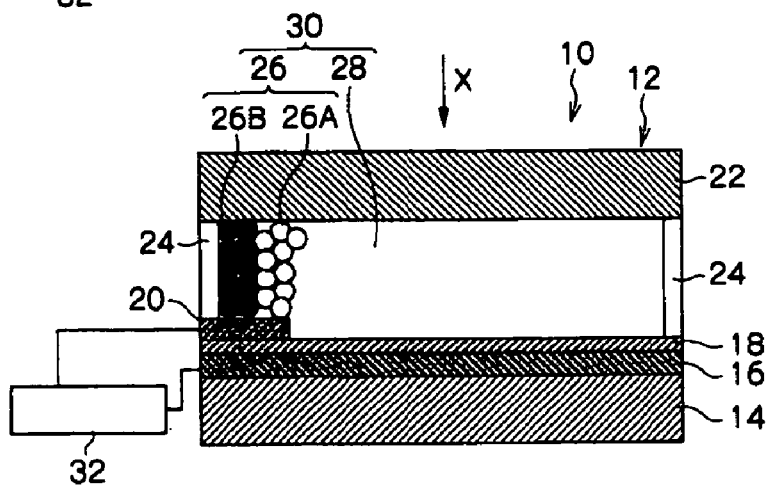

FIG. 2
FIG. 2A
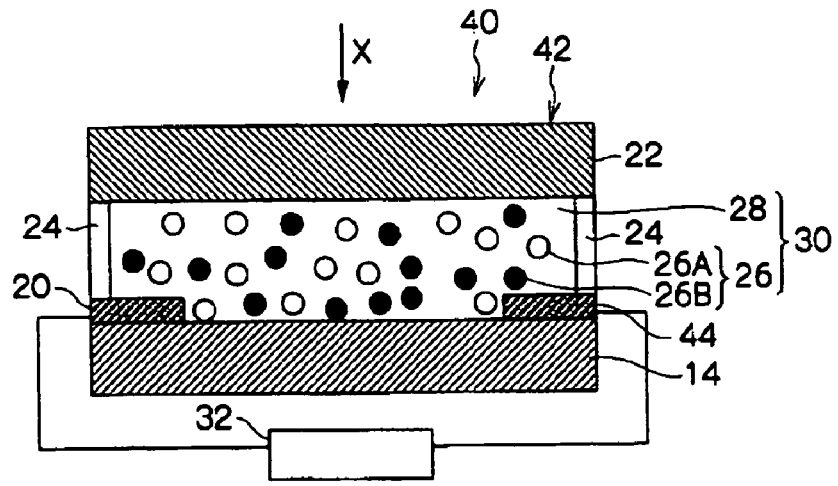
FIG. 2B
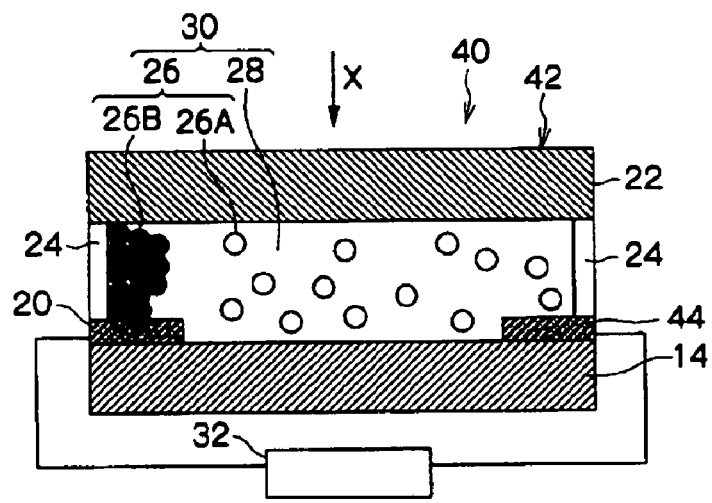
FIG. 2C
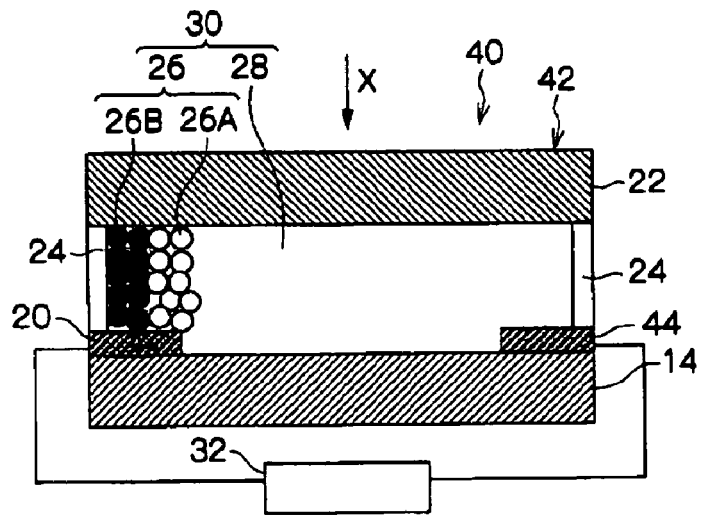

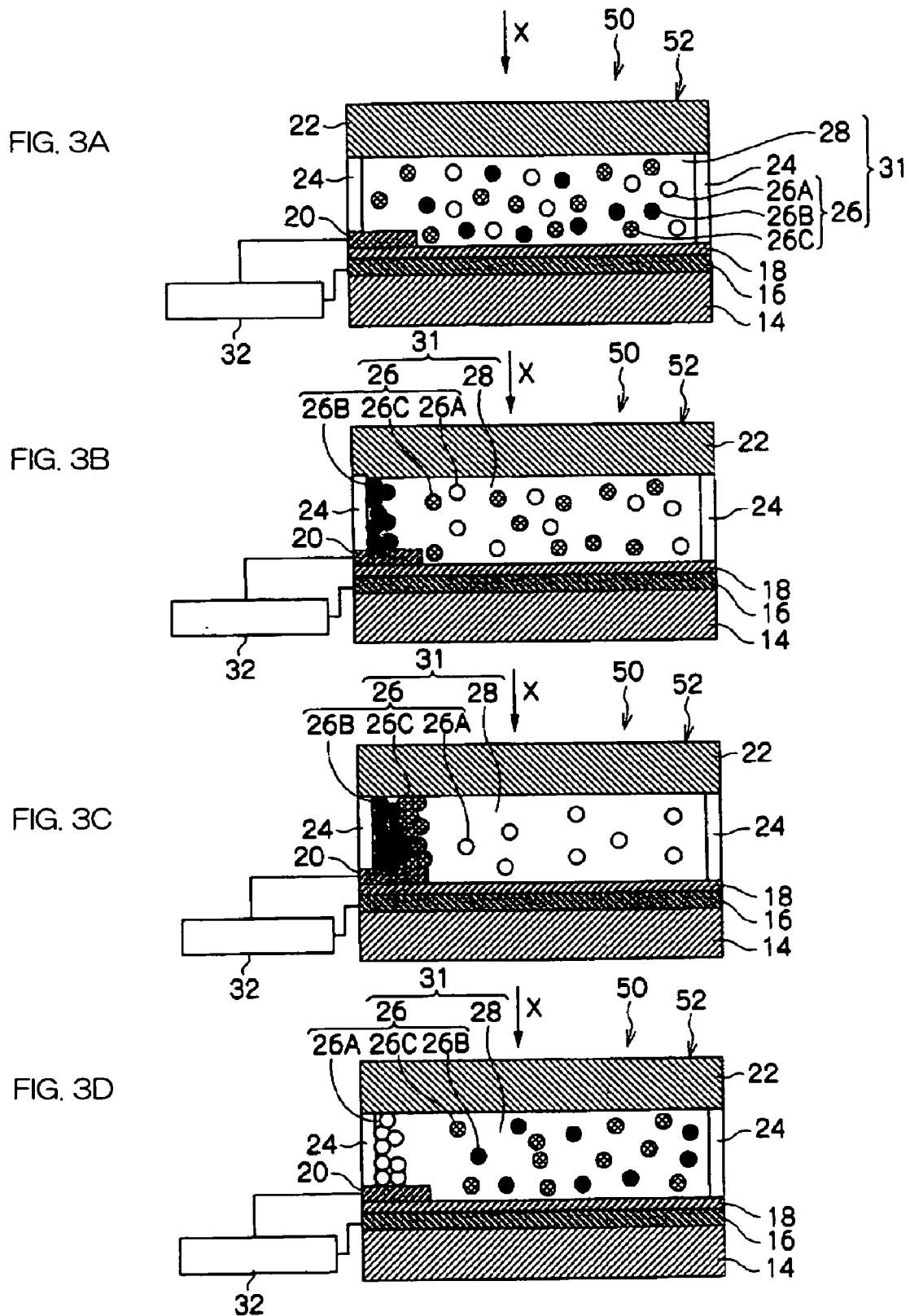

DISPLAY MEDIUM, DISPLAY DEVICE AND DISPLAY METHOD

CROSS-REFERENCE TO RELATED APPLICATION

This application claims priority under 35 USC 119 from Japanese Patent Application No. 2005-340093, the disclosure of which is incorporated by reference herein.

BACKGROUND OF THE INVENTION

1. Field of Invention

The present invention relates to a display medium and a display method. In particular, the invention relates to a display medium and a display method using charged mobile fine particles widely usable as optical elements such as dimmer glass, a dimmer element, and a display element.

2. Description of the Related Art

Along with the advancement of the highly information-based society, needs of electronic paper systems, color display systems, and large surface area display systems have been increased. As technologies to realize these systems, display technologies such as CRT, liquid crystal, EL, LED, and plasma have been developed. Further, besides these self-light-emitting systems, developments of reflection type display systems, which can save electric power consumption and scarcely cause an uncomfortable feeling to eyes of human being, have been investigated. As the reflection type display system, a reflection type liquid crystal technique is dominantly used.

On the other hand, while needs for the next generation of electronic paper display systems are very high, the present situation is that hopeful techniques to satisfy the needs have not established yet. Examples of known candidate methods supposed to be practically usable include an electrophoresis method, a liquid crystal method, and an organic EL method.

Since a liquid crystal method is a filter method, it has a problem that the medium thickness and weight are difficult to decrease. Since an organic EL method is a self-light-emitting type, there is a problem that it has no memory and its uses are thus limited within a narrow range.

As a display element using an electrophoresis method, the following techniques have been disclosed.

A method of using microcapsules arranged between a pair of electrodes, wherein a dispersion media and electrophoresis particles are encapsulated in the microcapsules, has been disclosed. Also, a magnetophoresis method using microcapsules encapsulating a magnetic fluid has been reported.

Further, a method of selectively driving plural kinds of colored particles disposed in a mixed state in a single microcapsule has been disclosed.

However, since all of these methods use microcapsules, it is difficult to carry out fine dot display and full color display. In the case of a conventionally-known method, it was difficult to selectively drive the particles in principle.

Further, a structure has been described in which approximately the same amount of charged electrophoresis particles are each disposed in a plurality of sections divided along the surfaces of a pair of substrates having a prescribed distance therebetween, and the dispersion medium is blue and the electrophoresis particles are black. It has been reported that the display quality can be improved by the structure.

However, the structure has difficulty in full color display, and must have a parallel arrangement because if layered, color display by a subtractive color-mixing method using combination of particles in the respective layers cannot be carried out. As a result, the apparatus becomes complicated.

Further, a method for carrying out color display by arranging the cells or microcapsules expressing a plurality of colors in parallel has been disclosed (. In this method, owing to the parallel arrangement, high resolution and sufficient contrast cannot be achieved.

Further, a method of layering two or more layers of light transmitting electrophoresis parts containing particles and/or a medium in vertical direction has been disclosed. However, dyes are used for coloring the particles and therefore no sufficient coloration density is obtained.

Further, a method has been disclosed wherein the cells having two display electrodes arranged at overlaying positions, two collection electrodes, and two kinds of light transmitting colored particles are layered or parallel arranged. However, since relatively large particles colored by dyes are employed, no sufficient color density can be obtained and stability of the coloring agents are problematic.

Furthermore, a method where particles are moved in a direction vertical to a substrate has been disclosed, wherein the particles are colorless in a dispersed state and show a color of particles in a agglomerated state. However, in this method, since a predetermined color is obtained by agglomerating particles, a plurality of cells wherein the particles are encapsulated has to be prepared and area gradation has to be applied in order to realize multi-colorization and multi-gradations. Accordingly, since it is difficult to represent one pixel with one cell and to realize colorization in one pixel, the method has problems in that high resolution is difficult to obtain and sufficient contrast cannot be obtained.

SUMMARY OF THE INVENTION

The present invention has been made in view of the above circumstances and provides a display medium, a display device and a display method.

According to an aspect of the invention, the display medium comprises a dimmer layer which comprises at least two kinds of charged mobile fine particles, wherein each of the at least two kinds of the charged mobile fine particles respectively has different coloration and a different mobility, and the charged mobile fine particles of at least one kind of the at least two kinds show coloration when in a dispersed state.

According to anther aspect of the invention, the display device comprises a dimmer layer and an electric field forming unit which forms an electric field in the dimmer layer, wherein the dimmer layer comprises at least two kinds of charged mobile fine particles, each of the at least two kinds of the charged mobile fine particles respectively has different coloration and a different mobility, and the charged mobile fine particles of at least one kind of the at least two kinds show coloration when in a dispersed state.

According to anther aspect of the invention, the display method comprises putting all charged mobile fine particles in a display medium comprising a dimmer layer comprising at least two kinds of the charged mobile fine particles in a dispersed state; and keeping at least one kind of the at least two kinds of the charged mobile fine particles in a dispersed state and putting another kind of the at least two kinds of the charged mobile fine particles in a non-dispersed state, wherein each of the at least two kinds of the charged mobile fine particles respectively has different coloration and a different mobility, and the charged mobile fine particles of at least one kind of the at least two kinds show coloration when in a dispersed state.

BRIEF DESCRIPTION OF THE DRAWINGS

FIGS. 1A through 1C are schematic diagrams showing an example of a case where a display medium according to the present invention includes two kinds of charged mobile fine particles in a dimmer layer. FIG. 1A is a schematic diagram showing a state where both kinds of charged mobile fine particles are dispersed in the dimmer layer. FIG. 1B is a schematic diagram showing a state where one kind of the two kinds of the charged mobile fine particles is dispersed. FIG. 1C is a schematic diagram showing a state where all charged mobile fine particles are agglomerated toward one electrode.

FIGS. 2A through 2C are schematic diagrams showing an example having a configuration different from that shown in FIGS. 1A through 1C, in which a display medium according to the invention includes two kinds of charged mobile fine particles in a dimmer layer. FIG. 2A is a schematic diagram showing a state where both kinds of charged mobile fine particles are dispersed in the dimmer layer, FIG. 2B is a schematic diagram showing a state where one kind of the two kinds of the charged mobile fine particles is dispersed, and FIG. 2C is a schematic diagram showing a state where all the charged mobile fine particles are agglomerated toward one electrode.

FIGS. 3A through 3D are schematic diagrams showing an example of a case where a display medium according to the invention includes three kinds of charged mobile fine particles in a dimmer layer. FIG. 3A is a schematic diagram showing a state where all three kinds of charged mobile fine particles are dispersed in the dimmer layer. FIG. 3B is a schematic diagram showing a state where one kind of the three kinds of charged mobile fine particles is agglomerated toward one electrode. FIG. 3C is a schematic diagram showing a state where one kind of the three kinds of the charged mobile fine particles is dispersed. FIG. 3D is a schematic diagram showing a state where a different kind of the three kinds of charged mobile fine particles from FIG. 3B is agglomerated toward one electrode.

DETAILED DESCRIPTION OF THE INVENTION

Figure 4:
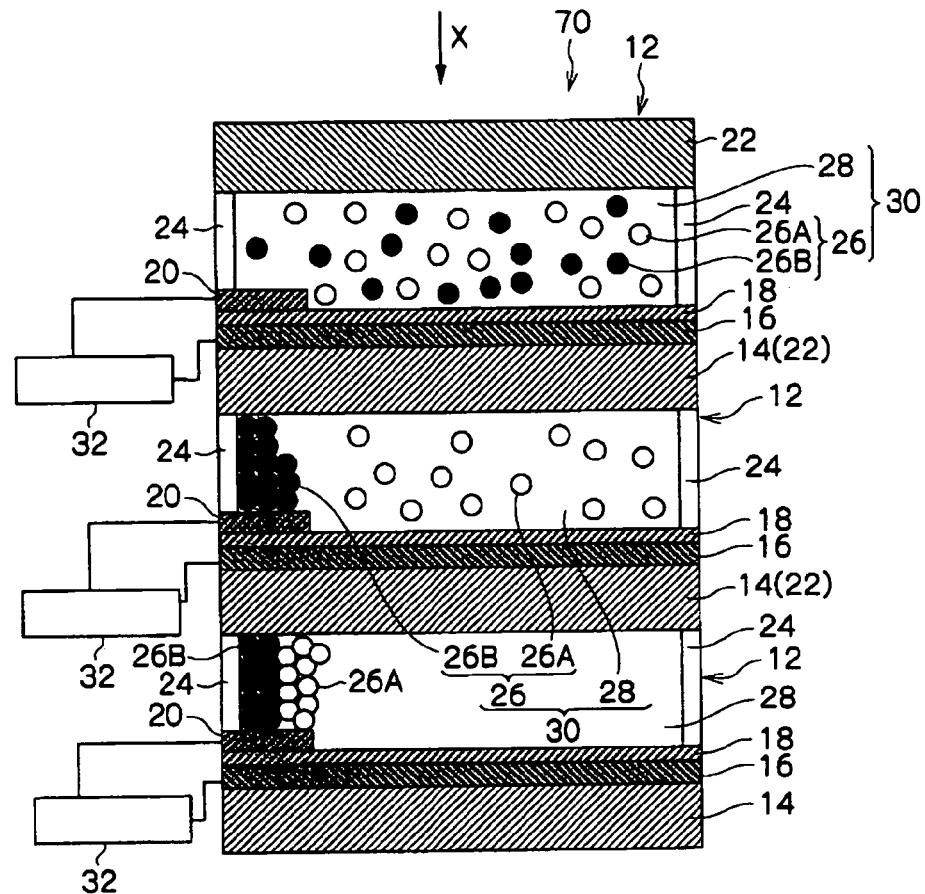
FIG. 4 is a schematic diagram showing an example where a display medium according to the invention has a configuration where dimmer unit cells are layered.

Hereinafter, the present invention will be described in more detail.

Display Medium

The display medium of the invention comprises a dimmer layer which comprises at least two kinds of charged mobile fine particles. The charged mobile fine particles of each of the two kinds has different coloration and mobility.

Among the charged mobile fine particles of the at least two kinds, the charged mobile fine particles of at least one of the kinds show coloration when they are in a dispersed state. According to this characteristic, when an electric field having a given intensity is formed in the dimmer layer, charged mobile fine particles having larger mobility move faster than charged mobile fine particles having smaller mobility in the dimmer layer. Accordingly, when the electric intensity is varied (controlled) depending on the kind of the charged mobile fine particles so as to selectively move the charged mobile fine particles in the dimmer layer, it becomes possible to control the kinds of the charged mobile fine particles that are dispersed in the dimmer layer. As a result, multi-color display in one dimmer layer may be realized. Furthermore, a display medium of the invention that contains such a dimmer layer may realize a full-color display with high resolution.

Dimmer Layer

A dimmer layer contained in a display medium according to the invention includes at least two kinds of charged mobile fine particles that show respectively different colorations and mobilities.

Among these, charged mobile fine particles of at least one of the kinds thereof show coloration when in a dispersed state. One or more kind of the charged mobile fine particles, each of which show coloration when in a dispersed state, may be used in the invention.

That is, in the dimmer layer according to the invention, the mobility of the respective charged mobile fine particles belonging to the same kind (group) of charged mobile fine particles are constituted so as to be substantially same, and the charged mobile fine particles belonging to the same kind of charged mobile fine particles show the same color in a dispersed state.

Further, additives such as an insulating liquid, a polymer resin or a high molecular weight pigment disperser may be further added to the dimmer layer as necessary.

Mobility, as referred to above, expresses a distance at which the respective particles of a group of charged mobile fine particles can move within a unit time under a unit electric intensity. That is, the mobility denotes an average traveling speed of the charged mobile fine particles under a unit electric field.

The above phrase "showing coloration in a dispersed state" means showing hue observable with eye in the state that the charged mobile fine particles are dispersed in a medium.

The hue can be various colors by changing the charged mobile fine particles, especially the metal, shape, and particle diameter (volume average particle diameter) of metal colloidal particles.

The coloration by metal colloid such as gold colloid is attributed to plasma vibration of electrons and is caused by coloration mechanism so-called plasmon absorption. It is said that the coloration by the plasmon absorption is attributed to that free electrons in the metal are swung by photoelectric field; charge appears on the surface of the particles; and non-linear polarization is thus caused. The coloration by the metal colloid has high chromaticity and light transmittance, and is excellent in durability. Such coloration by the metal colloid can be observed when the particles are so-called nano-particles with a particle diameter of several nanometers to several tens nanometers, and colloids with a narrow particle diameter distribution are advantageous as a coloring material.

Each kind of the plurality of kinds of charged mobile fine particles contained in the dimmer layer of a display medium according to the invention respectively has a different mobility.

Among the plurality of kinds of charged mobile fine particles contained in the dimmer layer, the difference in mobility between kinds nearest in mobility is preferably approximately $1 \times 10^{-6}$ cm$^2$/Vs or more, more preferably approximately $5 \times 10^{-6}$ cm$^2$/Vs or more and particularly preferably approximately $1 \times 10^{-5}$ cm$^2$/Vs or more.

When the difference in mobility between kinds nearest in mobility is less than approximately $1 \times 10^{-6}$ cm$^2$/Vs, when an electric field is formed in the dimmer layer, there is the problem that, since the difference in traveling distances in a unit time between the kinds of the charged mobile fine particles are too small, the display medium does not generate excellent color variation.

The mobility of the charged mobile fine particles contained in the dimmer layer can be measured by filling a cell which is sandwiched between electrodes at both ends with at least charged mobile fine particles, and measuring the electric intensity established in the cell by applying a voltage to the electrodes, the time during which the electric field is applied to the electrodes, and the traveling distance traveled by a particle within the time during which the electric field is formed in the cell.

When the traveling distance is measured, by use of for instance a CCD, the movement of the particles and the color variation caused by the movement of the particles are observed and measured.

Furthermore, as a method of measuring the mobility, a method where an electric field is applied to a cell and the process whereby the color of the cell varies is evaluated as a variation in the transmittance or the reflectance with time can be applied as well. Specifically, the voltage value of a voltage when the voltage is applied to the electrodes that sandwich the cell, the time period during which the voltage is applied and the variation in the transmittance or the reflectance of the cell after the voltage is applied are measured by use of a spectrophotometer such as USB 2000 (trade name, available from Ocean Optics Co., Ltd.).

Charged Mobile Fine Particles

The invention employs multiple kinds of charged mobile fine particles. The coloration and mobility of each kind of the charged mobile fine particles are different from those of other kinds. At least one kind of the plural kinds of charged mobile fine particles shows coloration and a given mobility when the charged mobile fine particles thereof are in a dispersed state. Namely, the charged mobile fine particles exhibit the mobility when an electric field (voltage) is applied. There is no other particular limitation for the charged mobile fine particles used in the invention. One or more kind of the charged mobile fine particles, each of which show coloration when in a dispersed state, may be used in the invention.

In terms of coloration and stability, metal colloidal particles having the color strength due to the surface plasmon resonance are preferable as the specific charged mobile fine particles which show coloration in a dispersed state. Hereinafter, examples of the metal colloidal particles will be described, while the particles should not be limited to these examples.

Examples of metals of the metal colloidal particles are noble metals and copper (hereinafter, all together, referred to as metal). The noble metals are not particularly limited and preferable examples thereof include gold, silver, ruthenium, rhodium, palladium, osmium, iridium, and platinum. Among them, gold, silver, platinum and copper are preferable.

Methods for obtaining the metal colloidal particles have been known, such as: a chemical method of reducing metal ions and then preparing nano-particles via metal atoms and metal clusters; and a physical method of trapping metals in the form of fine particles generated by evaporation of a bulk metal in an inert gas using a cold trap, or a physical method of forming a metal thin film on a polymer thin film by vacuum evaporation, then breaking the metal thin film by heating, and successively dispersing the metal fine particles in a polymer in solid-phase state. The chemical method does not require any special apparatus and is thus advantageous for preparation of metal colloidal particles of the invention, and common examples thereof will be described later. However, the methods should not be limited to the exemplified methods.

The metal colloidal particles are formed from a compound of the above-mentioned metal. The compound of the metal is not particularly limited as long as it contains the metal and examples thereof include chloroauric acid, silver nitrate, silver acetate, silver perchlorate, chloroplatinic acid, potassium chloroplatinate, copper (II) chloride , copper (II) acetate, and copper (II) sulfate.

The metal colloidal particles can be obtained in the form of a dispersion liquid of metal colloidal particles protected with a dispersant by reducing the above-mentioned metal compounds dissolved in a solvent to metals, and may also be obtained in the form of a solid sol by further removing the solvent of the dispersion liquid. The metal colloidal particles can be obtained in any other form than these forms, too.

At the time of dissolving the metal compounds, a pigment dispersant having a high molecular weight, which will be described later, may be used. Use of the pigment dispersant having a high molecular weight makes it possible to obtain stable metal colloidal particles protected by the dispersant.

At this time, when the desired conditions of the kind, the concentration and the stirring time period of a high molecular weight pigment disperser are selected and applied, the concentration of the disperser adsorbed on the surface of a metal colloid particle can be controlled. That is, when the concentration of the high molecular weight pigment disperser is made richer or the stirring time period thereof is lengthened, the amount of the high molecular weight pigment disperser adsorbed on the surface of the metal colloid particle can be increased. Thereby, the mobility of the metal colloid particles can be controlled.

When using the metal colloidal particles in the invention, the above-mentioned metal colloidal particles having the form of a dispersion liquid or that obtained by re-dispersing the above-mentioned metal colloidal particles having the form of a solid sol in a solvent can be used. The form of the metal colloidal particles to be used is not particularly limited.

When using the metal colloidal particles having the form of a dispersion liquid, the solvent to be used in the preparation is preferably an insulating liquid described below. Further, when using the solid sol for being re-dispersed, the solvent to be used for preparing the solid sol may be any solvent without any particular limitation. As the solvent to be used in the re-dispersion, insulating liquids described below are preferable.

The metal colloidal particles can show various colors based on the kind, shape, and volume average particle diameter of the metal. Therefore, use of the charged mobile fine particles with controlled kind, shape, and volume average particle diameter of the metal makes it possible to give various hues including RGB coloration, and makes the display element of the invention be a color display element. Further, control of the shape and particle diameter of the metal and the metal colloidal particles to be obtained makes it possible to provide an RGB full color-type display element.

The volume average particle diameter of the metal colloidal particles for showing the respective colors of R, G, and B in the RGB system cannot be specifically limited since it depends on the metal, the particle preparation condition, and the shape. For example, in the case of gold colloidal particles, as the volume average particle diameter becomes larger, the color tends to change from R coloration to G coloration, and further to B coloration.

A laser diffraction scattering method including radiating laser beam to particles and measuring the average particle diameter from the intensity distribution pattern of the diffracted and scattered light from the particles can be employed as the measurement method of the volume average particle diameter in the invention.

The content (% by weight) of the charged mobile fine particles in the total weight of the dimmer layer is not particularly limited as long as the concentration is such that a desired hue can be obtained. It is effective for the display device to adjust the content in accordance with the thickness of the dimmer layer. That is, to obtain a desired hue, the content is adjusted to be low when the dimmer layer is thick, and the content is adjusted to be high when the dimmer layer is thin. Generally, it is in a range of approximately 0.01 to 50% by weight.

The above-mentioned metal colloidal particles may be prepared by common preparation methods described, for example, in "Synthesis and Preparation of Metal Nano-Particles, Control Techniques and Application Developments", Technical Information Institute Co., Ltd., 2004. Hereinafter, one example will be described; however, the method should not be limited to the exemplified method.

Solid Sol

Hereinafter, one example of a solid sol of a metal in the preparation of the metal colloidal particles as mentioned above will be described.

In the solid sol of a metal in the invention, in terms of the coloration, the above-mentioned metal colloidal particles are preferably contained in an amount of approximately 50 mmol or more per 1 kg of the pigment dispersant having a high molecular weight, which will be described later. If the amount of the metal colloidal particles is less than approximately 50 mmol, the coloration becomes insufficient. The content of metal colloidal particles is more preferably approximately 100 mmol or more.

With respect to the solid sol of a metal in the invention, the metal colloidal particles preferably have a volume average particle diameter of approximately 1 to 100 nm, and more preferably have a volume average particle diameter of approximately 2 to 50 nm. If it is smaller than approximately 1 nm, the coloring strength may be low, and if it exceeds approximately 100 nm, the chroma may be low. Further, the solid sol of a metal in the invention preferably has a narrow particle size distribution. If the particle size distribution is wide, the chroma may be low, and therefore it may be undesirable.

Since the solid sol of a metal of the invention may have high chroma and contain the metal colloidal particles in a high concentration, the coloration may be good. The metal solid sol of the invention may have good compatibility with a polymer resin (binder) such as a resin. Therefore, when the metal solid sol is added to such a polymer resin (binder), it may be stable and may not be agglomerated and have sufficient coloring strength. In accordance with necessity, other additives may be added. Further, the metal solid sol may be dissolved in a proper solvent and be used in the form of a hydrosol or organosol.

Production Method of Solid Sol

Hereinafter, one example of a production method of the above-mentioned metal solid sol will be described, however, the method should not be limited to the exemplified method. A metal compound is dissolved in a solvent, mixed with a pigment dispersant having a high molecular weight, and then reduced to metal, thereby forming metal colloidal particles protected with the pigment dispersant having a high molecular weight. After that, the solvent is removed to obtain a solid sol.

In the production method, the above-mentioned metal compound may be used after being dissolved in a solvent. The solvent is not particularly limited as long as it can dissolve the metal compound. Examples of the solvent include water and water-soluble organic solvents such as acetone, methanol, and ethylene glycol. They may be used alone or in combination of two or more. In the invention, water and a water-soluble organic solvent are preferably used in combination.

When the above-mentioned solvent is a mixed solvent of water and a water-soluble organic solvent, it is preferable that at first, the above-mentioned metal compound is dissolved in water and then the water-soluble organic solvent is added thereto for obtaining the solution. In this case, the metal compound is preferably dissolved in water in a concentration of approximately 50 mM or higher. If the concentration is lower than approximately 50 mM, it may be impossible to obtain a solid sol containing metal colloidal particles in a high ratio. The concentration is more preferably approximately 100 mM or higher.

When using silver as the metal, the pH of the above-mentioned aqueous solution is preferably at approximately 7 or lower. If the pH exceeds approximately 7, for example, when using silver nitrate as the silver compound, a byproduct such as silver oxide may be produced at the time of reducing silver ion. As a result, the solution may become cloudy and therefore it may be undesirable. If the pH of the above-mentioned aqueous solution exceeds approximately 7, it is preferable to adjust the pH to be approximately 7 or lower by adding, for example, about 0.1N of nitric acid.

The volume ratio of the above-mentioned water-soluble organic solvent to water for dissolving the metal compound is preferably approximately 1.0 or higher. If it is less than approximately 1.0, a water-insoluble pigment dispersant having a high molecular weight may not be dissolved. The volume ratio is preferably approximately 5.0 or higher.

In the preparation of the metal colloidal particles of the invention, it is also effective to add the pigment dispersant having a high molecular weight to a solution of the above-mentioned metal compound. The pigment dispersant having a high molecular weight is preferably water-insoluble in the case where the solvent is a mixed solvent of water and a water-soluble organic solvent. If the dispersant is water-soluble, at the time of obtaining a solid sol by removing the water-soluble organic solvent, it may become difficult to precipitate the colloidal particles. As the water-insoluble pigment dispersant having a high molecular weight, examples may be DISPERBYK 161 and DISPERBYK 166 (both trade names, manufactured by Byk Mallinckrodt International Corporation,) and SOLSPERSE 24000 and SOLSPERSE 28000 (both trade names, manufactured by Zeneca K.K.).

The addition amount of the pigment dispersant having a high molecular weight is preferably approximately 20 to 1000 parts by weight based on 100 parts by weight of the above-mentioned metal. If it is lower than approximately 20 parts by weight, the dispersibility of the metal colloidal particles may be insufficient. If it exceeds approximately 1,000 parts by weight, in the case the pigment dispersant having a high molecular weight is blended to a coating material or a resin molded substance, the mixed amount of the pigment dispersant having a high molecular weight may become so large as to cause adverse effects on the physical properties. The addition amount is more preferably approximately 50 to 650 parts by weight.

In the preparation of metal colloidal particles in the invention, after the pigment dispersant having a high molecular weight is added to the above-mentioned metal compound solution, the metal ion is reduced. The reduction method is not particularly limited. Examples thereof include a method of carrying out chemical reduction by adding a compound and a method of carrying out reduction by photo-irradiation using a high pressure mercury lamp.

The above-mentioned compound to be added is not particularly limited, and examples thereof include alkali metal boron hydrides such as sodium boron hydride; hydrazine compounds; citric acid or its salts, or succinic acid and its salts, which are conventionally used as reducing agents. In the invention, besides the above-mentioned reducing agents, amines can be used.

The above-mentioned amines can reduce the metal ion to the metal at around normal temperature by adding the amines to the metal compound solution and stirring and mixing the resulting solution. Use of the amines may make it unnecessary to use a risky or harmful reducing agent and make reduction of the metal compound possible at a temperature of about 5 to 100° C., preferably about 20 to 80° C. without heating and a special light radiation apparatus.

The above-mentioned amines are not particularly limited and examples thereof include aliphatic amines such as propylamine, butylamine, hexylamine, diethylamine, dipropylamine, dimethylethylamine, diethylmethylamine, triethylamine, ethylenediamine, N,N,N',N'-tetramethylethylenediamine, 1,3-diaminopropane, N,N,N', N'-tetramethyl-1,3-diaminopropane, triethylenetetramine or tetraethylenepentamine; alicyclic amines such as piperidine, N-methylpiperidine, piperazine, N,N'-dimethylpiperazine, pyrrolidine, N-methylpyrrolidine, or morpholine; aromatic amines such as aniline, N-methylaniline, N,N-dimethylaniline, toluidine, anisidine, or phenetidine; and aralkylamines such as benzylamine, N-methylbenzylamine, N,N-dimethylbenzylamine, phenethylamine, xylylenediamine, or N,N,N', N'-tetramethylxylylenediamine. Examples of the above-mentioned amines further include alkanolamines such as methylaminoethanol, diethylaminoethanol, triethanolamine, ethanolamine, diethanolamine, methyldiethanolamine, propanolamine, 2-(3-aminopropylamino)ethanol, butanolamine, hexanolamine, or dimethylaminopropanol. Among them, alkanolamines are preferable.

The addition amount of the above-mentioned amines is preferably approximately 1 to 50 mol based on 1 mole of the above-mentioned metal compound. If it is less than approximately 1 mole, reduction may not be carried out sufficiently, and if it exceeds approximately 50 mol, the stability against agglomeration of the produced colloidal particles may be deteriorated. The addition amount is more preferably approximately 2 to 8 mol.

In a case when the above-mentioned sodium boron hydride is used as the reducing agent, there is no need to carry out heating or use any special light radiating apparatus, since reduction can be carried out at a normal temperature.

The addition amount of sodium boron hydride is preferably approximately 1 to 50 mol based on 1 mole of the above-mentioned metal compound. If it is less than approximately 1 mole, reduction may not be carried out sufficiently, and if it exceeds approximately 50 mol, the stability against agglomeration of the produced colloidal particles may be deteriorated. The addition amount is more preferably approximately 1.5 to 10 mol.

When citric acid or its salts are used as the reducing agent, the metal ion can be reduced by heating and refluxing the mixture in the presence of an alcohol. A preferable example of the citric acid or its salts is sodium citrate.

The addition amount of the citric acid or its salts is preferably approximately 1 to 50 mol based on 1 mole of the above-mentioned metal compound. If it is less than approximately 1 mole, reduction may not be carried out sufficiently and if it exceeds approximately 50 mol, the stability against agglomeration of the produced colloidal particles may be deteriorated. The addition amount is more preferably approximately 1.5 to 10 mol.

In the preparation of the metal colloidal particles in the invention, after the metal ion is reduced, the metal colloidal particles protected with the pigment dispersant having a high molecular weight are precipitated and then the above-mentioned solvent is removed. In the case that as the solvent, water and a water-soluble organic solvent are used, the solvent can be removed according to the following method in accordance to the characteristics of the pigment dispersant having a high molecular weight to be used.

In the case the pigment dispersant having a high molecular weight is water-insoluble, it is preferable that the water-soluble organic solvent is at first removed by evaporation or the like, and water is removed after the metal colloidal particles protected with the pigment dispersant having a high molecular weight are precipitated. Since the pigment dispersant having a high molecular weight is water-insoluble, removal of the above-mentioned water-soluble organic solvent promotes precipitation of the metal colloidal particles protected with the pigment dispersant having a high molecular weight.

In this case, the water-soluble organic solvent preferably has a higher evaporation speed than that of water. If the evaporation speed of the water-soluble organic solvent is lower than that of water, when a water-insoluble dispersant is used as the above-mentioned pigment dispersant having a high molecular weight, the water-soluble organic solvent may not be removed prior to removing water and thus the metal colloidal particles cannot be precipitated for obtaining the solid sol by removing the solvent.

In the case the pigment dispersant having a high molecular weight is a solvent type, an excess amount of a non-polar organic solvent which does not dissolve the pigment dispersant having a high molecular weight can be added to precipitate the metal colloidal particles protected by the pigment dispersant having a high molecular weight and then the solvent can be removed by decantation or the like.

The metal colloidal particles protected with the pigment dispersant having a high molecular weight may be washed with ion-exchanged water after removal of the solvent. In the case the metal colloidal particles protected with the pigment dispersant having a high molecular weight are precipitated by addition of an excess amount of the above-mentioned non-polar solvent, the colloidal particles can be washed with the non-polar solvent.

In the production method of the metal solid sol of the invention, the obtained metal solid sol has a colloid average particle diameter of approximately 1 to 100 nm and a narrow particle size distribution, so that the solid sol may have a high density color and high chromaticity.

The production method of the metal solid sol of the invention can be carried out simply in a small number of processes of dissolving the above-mentioned metal compound in a solvent to obtain a solution, adding the above-mentioned pigment dispersant having a high molecular weight, reducing the metal compound to the metal, and thereafter removing the solvent. Moreover, the method can produce a metal solid sol having increased chromaticity, which contains metal colloidal particles in a high concentration as compared with conventional metal colloidal particles. Especially, use of an alkanolamine makes the production easy under moderated conditions of about 20 to 80° C.

The metal colloidal particles can be prepared by the above-described manner, and commercialized metal colloidal particles may be used as the metal colloidal particles in the invention as long as the colloidal particles show coloration in a dispersed state.

Further, the metal colloidal particles can be prepared practically by the following methods (1) to (4), however it should not be limited to these preparation methods.

Preparation Method of Dispersion Liquid of Metal Colloidal Particles

A dispersion liquid of the metal colloidal particles used in the invention may be prepared in any one state of a water-based liquid and a non-polar solvent-based dispersion liquid. For example, in the case of preparing a metal colloidal particle dispersion liquid using gold and silver, the dispersion liquid can be prepared by the following production methods, however it should not be limited to the following production methods.

(1) After a metal compound (e.g. tetrachloroauric (III) acid tetrahydrate) is dissolved in an insulating liquid (e.g. water), a solution containing a pigment dispersant having a high molecular weight (e.g. SOLSPERSE 20000 (trade name, manufactured by Zeneca K.K.)) in a weight amount 1.5 times as much as that of the metal (e.g. gold) is added and stirred.

After an aliphatic amine (e.g. dimethylaminoethanol) is added to the mixed solution to start reduction of gold ion, filtration and concentration is carried out to obtain a gold colloidal particle solution.

(2) After a metal compound (e.g. tetrachloroauric (III) acid tetrahydrate) is dissolved in water, a solution obtained by dissolving a pigment dispersant having a high molecular weight (e.g. SOLSPERSE 24000 (trade name, manufactured by Zeneca K.K.)) in a weight amount 1.5 times as much as that of the metal (e.g. gold) in a non-polar organic solvent (e.g. acetone) is added and stirred.

After an aliphatic amine (e.g. dimethylaminoethanol) is added to the mixed solution to start reduction of gold ion, the non-polar solvent is evaporated to obtain solid sol containing gold colloidal particles and pigment dispersant having a high molecular weight. After that the solid sol is washed with water by decantation and dissolved in a non-polar organic solvent (e.g. ethanol) to obtain a gold colloidal particle solution.

(3) After a metal compound (e.g. silver nitrate (I)) is dissolved in water, an aqueous solution containing a pigment dispersant having a high molecular weight (e.g. SOLSPERSE 20000 (trade name, manufactured by Zeneca K.K.)) in a weight amount 1.5 times as much as that of the metal (e.g. silver) is added and stirred. After an aliphatic amine (e.g. dimethylaminoethanol) is added to the mixed solution to start reduction of silver ion, filtration and concentration is carried out to obtain a water-based silver colloidal particle solution.

(4) After a metal compound (e.g. silver (I) nitrate) is dissolved in water, a solution obtained by dissolving a pigment dispersant having a high molecular weight (e.g. SOLSPERSE 24000 (trade name, manufactured by Zeneca K.K.)) in a weight amount 1.5 times as much as that of the metal (e.g. silver) in a non-polar organic solvent (e.g. acetone) is added and stirred. After an aliphatic amine (e.g. dimethylaminoethanol) is added to the mixed solution to start reduction of silver ion, the non-polar solvent is evaporated to obtain solid sol containing silver colloidal particles and pigment dispersant having a high molecular weight. After that the solid sol is washed with water by decantation and dissolved in a non-polar organic solvent (e.g. toluene) to obtain a solvent type silver colloidal particle solution.

With respect to the above-mentioned metal colloidal particles and their liquids, those described in JP-A No. 11-76800 can be preferably used.

Here, as mentioned above, respective kinds of the charged mobile fine particles contained in the dimmer layer according to the invention have different mobilities.

As a method of preparation such that the mobility of the respective charged mobile fine particles that show different colors in a dispersed state differs, the kinds and concentrations of surfactants, pigment dispersers and surface processing agents of the charged mobile fine particles and the processing times when these are added and stirred are appropriately adjusted, and thereby charged mobile fine particles having different mobilities can be prepared.

Examples of the surfactant include cationic surfactants (alkyl amine salts and quartemary ammonium salts), nonionic surfactants (polyoxyethylene alkyl ether, polyoxyalkylene alkyl ether, polyoxyethylene derivatives, sorbitan fatty acid ester, polyoxyethylene sorbitan fatty acid ester, polyoxyethylene sorbitol fatty acid ester, glycerin fatty acid ester, polyoxyethylene fatty acid ester, polyoxyethylene hardened castor oil, polyoxyethylene alkyl amine and alkyl alcanol amide), anionic surfactants (alkyl sulfate ester salt, polyoxyethylene alkyl ether sulfuric acid ester salt, alkyl benzene sulfonic acid salt, alkyl naphthalene sulfonic acid ester, alkyl sulfosuccinic acid salt, alkyl diphenyl ether disulfonic acid salt, fatty acid salt, polycarbonic acid type polymer surfactant, aromatic sulfonic acid formalin condensate sodium salt and β-naphthalene sulfonic acid formalin condensate sodium salt) and amphoteric surfactants.

The higher the concentration of the surfactant and/or the concentration of the pigment disperser relative to the concentration of metal in the dimmer layer, the larger the mobility may become, and the lower the concentration of the surfactant and/or the concentration of the pigment disperser relative to the concentration of metal, the lower the mobility may be made.

The longer the processing time of the surfactant and/or the pigment disperser, the larger the mobility may be made, and the shorter the processing time of the surfactant and/or the pigment disperser, the smaller the mobility may be made.

Thus, when the preparing method of the charged mobile fine particles is controlled, the mobility may be controlled to a predetermined value for each kind of color that is shown during dispersion. Furthermore, depending as well on the metal kind, particle diameter and shape of the metal colloid particles, the mobility may be controlled to a predetermined value.

Insulating Liquid

A dispersion medium of the metal colloidal particles used in the invention is preferably an insulating liquid.

Specific preferable examples of the insulating liquids include hexane, cyclohexane, toluene, xylene, decane, hexadecane, kerosene, paraffin, isoparaffin, silicone oil, dichloroethylene, trichloroethylene, perchloroethylene, high-purity petroleum, ethylene glycol, alcohols, ethers, esters, dimethylformamide, dimethylacetamide, dimethyl sulfoxide, N-methylpyrrolidone, 2-pyrrolidone, N-methylformamide, acetonitrile, tetrahydrofuran, propylene carbonate, ethylene carbonate, benzine, diisopropylnaphthalene, olive oil, isopropanol, trichlorotrifluoroethane, tetrachloroethane, dibromotetrafluoroethane, and their mixtures.

Water (so-called pure water) may also be made preferably usable by removing impurities so as to provide a volume resistance as described below. The volume resistance is preferably approximately $10^3$ Ωcm or higher, more preferably in a range of approximately $10^7$ Ωcm to $10^{19}$ Ωcm, and even more preferably in a range of approximately $10^{10}$ Ωcm to $10^{19}$ Ωcm. Adjustment of the volume resistance as described above may suppress bubble generated by electrolysis of the liquid attributed to electrode reaction and give good repeating stability without deteriorating electrophoresis properties of the particles every time of electric power application.

The insulating liquids may be mixed with, based on necessity, an acid, an alkali, a salt, a dispersion stabilizer, a stabilizer for oxidation prevention and UV absorption, an antibacterial agent, and a preserver. These additives are preferably added in proper ranges so as to adjust the volume resistance in the above-specified range.

Polymer Resin

The charged mobile fine particles (metal colloidal particles) used in the invention are also preferably dispersed in a polymer resin. Preferable examples of the polymer resin include polymer gel and network polymer.

Examples of the polymer resin are polymer gel derived from natural polymers such as agarose, agaropectin, amylose, sodium alginate, alginic acid propylene glycol ester, isolychnane, insulin, ethylcellulose, ethylhydoxyethylcellulose, cardrun, casein, carrageenan, carboxymethyl cellulose, carboxymethyl starch, callose, agar, chitin, chitosan, silk fibroin, guar gum, pyrus cydonia seed, crown gall polysaccharide, glycogen, glucomannan, keratan sulfate, keratin protein, collagen, cellulose acetate, gelan gum, schizophyllan, gelatin, vegetable ivory mannan, tunicine, dextran, dermatan sulfate, starch, gum tragacanth, nigeran, hyaluronic acid, hydroxyethyl cellulose, hydroxypropyl cellulose, pustulan, funoran, decomposed xyloglucan, pectin, porphyran, methyl cellulose, methyl starch, laminarane, lichenan, lentinan, or locust been gum, and all kinds of polymer gel in the case when the polymer resin is a synthetic polymer.

Examples thereof further include polymers containing functional groups such as alcohol, ketone, ether, ester, or amido in a repeating unit therein. Specific examples thereof include polyvinyl alcohol, poly(meth)acrylamide compounds, polyvinylpyrrolidone, polyethylene oxide and copolymers containing these polymers.

Among them, in terms of production stability and electrophoresis property, gelatin, polyvinyl alcohol, and poly(meth) acrylamide are preferably used.

These polymer resins are preferably used in combination with the insulating liquid.

Pigment Dispersant Having High Molecular Weight

While the pigment dispersant having a high molecular weight is not particularly limited, those described below can be preferably used. That is: (i) a polymer having pigment affinity groups on the main chain and/or plural side chains while the polymer has a comb-like structure comprising a plurality of side chains constituting solvation portions; (ii) a polymer having a plurality of pigment affinity portions comprising pigment affinity groups in the main chain; and (iii) a linear polymer having pigment affinity groups comprising pigment affinity groups at the terminal of the main chain.

The pigment affinity group as used herein refers to a functional group having strong absorption strength on the surface of the pigment. Examples thereof in an organosol include tertiary amino groups, quaternary ammonium, heterocyclic groups having basic nitrogen atom(s), a hydroxyl group and a carboxyl group; and examples thereof in a hydrosol include a phenyl group, a lauryl group, a stearyl group, a dodecyl group and an oleyl groups,. The pigment affinity group exhibits strong affinity to metals. The pigment dispersant having a high molecular weight may exhibit sufficient performance as a protective colloid of metals by possessing the pigment affinity group.

The polymer (i) of the comb-like structure comprises a plurality of side chains constituting the solvation portion as well as a plurality of the pigment affinity groups, and these side chains are bonded to the main chain as if they are comb teeth. The structure as described above is herein named as the comb-like structure. A plurality of pigment affinity groups may present not only at the terminal of the side chain, but also at the midway of the side chain and in the main chain. The solvation portion has affinity to the solvent, and has a hydrophilic or hydrophobic structure. The solvation portion is composed of, for example, water-soluble polymer chains or hydrophobic polymer chains.

The comb-like polymer (i) is not particularly restricted. Examples of the polymer include: a polymer comprising poly (ethyleneimine) or salts thereof having a structure comprising at least one poly(carbonyl-alkyleneoxy)chain wherein the alkyleneoxy group has 3 to 6 carbon atoms in which each chain has 3 to 80 of the carbonyl-alkyleneoxy groups and is linked to poly(ethyleneimine) by an amide group or a salt cross-linking group as disclosed in JP-A No. 5-177123; a polymer comprising a reaction product between poly(lower alkylene)imine and polyester having free carboxylic acid groups in which at least two polyester chains are linked to each poly(lower alkylene)imine chain as disclosed in JP-A No. 54-37082; and a pigment dispersant obtained by allowing an amine compound and a carboxylic group-containing prepolymer with a number average molecular weight of 300 to 7,000 to react, simultaneously or in an arbitrary order, with a high molecular weight epoxy compound having epoxy groups at the terminal as disclosed in Japanese Patent Application Publication (JP-B) No. 7-24746.

The polymer (i) of the comb-like structure preferably contains approximately 2 to 3,000 pigment affinity groups in a molecule thereof. Dispersion stability may be insufficient when the number of the groups is less than 2. Handling of the polymer may become difficult due to too high viscosity while chromaticity may decrease due to wide particle diameter distribution of the colloid particles when the number of the groups exceeds 3,000. It is more preferable that the number of the pigment affinity groups is in a range of approximately 25 to 1,500.

The polymer (i) of the comb-like structure preferably has approximately 2 to 1,000 side chains that constitute the solvation portion. Dispersion stability may be insufficient when the number of the side chains is less than 2. Handling of the polymer may become difficult due to too high viscosity while chromaticity may decrease due to wide particle diameter distribution of the colloid particles when the number of the side chains exceeds 1,000. It is more preferable that the number of the side chains is in a range of approximately 5 to 500.

The polymer (i) of the comb-like structure preferably has a number average molecular weight of approximately 2,000 to 1,000,000. Dispersion stability may be insufficient when the molecular weight is less than 2,000. Handling of the polymer may become difficult due to too high viscosity while chromaticity may decrease due to wide particle diameter distribution of the colloid particles when the molecular weight exceeds 1,000,000. It is more preferable that the molecular weight is in a range of approximately 4,000 to 500,000.

A plurality of pigment affinity groups are aligned along the main chain in the copolymer (ii) having a plurality of the pigment affinity portions comprising the pigment affinity groups in the main chain, and the pigment affinity groups are hanged, for example, from the main chain. The "pigment affinity portion" as used in the invention refers to a portion having one or a plurality of pigment affinity group(s) that function as anchors for adsorbing onto the surface of the pigment.

Examples of the copolymer (ii) include: a reaction product obtained by reacting a mixture of polyisocyanate with a monohydroxyl compound and one of a monohydroxyl monocarboxylic acid and a monoamino monocalboxylic acid with a compound containing at least one basic ring nitrogen and a group that is capable of reacting with an isocyanate group disclosed in JP-A No. 4-210220; a polymer in which groups having a plurality of tertiary amino groups or basic cyclic nitrogen atoms are hanged from a main chain comprising polyurethane/polyurea disclosed in JP-A Nos. 60-16631, 2-612 and 63-241018; a copolymer comprising sterically stabilizing units having water-soluble poly(oxyalkylene) chains, structural units and amino group-containing units disclosed in JP-A No. 1-279919, wherein the amino group-containing unit contains tertiary amino groups or acid addition salts thereof, or quaternary ammonium groups, and wherein the copolymer contains 0.025 to 0.5 meq of amino groups per 1 g of the copolymer; and an amphipathic co-polymer having a weight average molecular weight of from 2,500 to 20,000 inclusive and comprising: an addition polymer backbone having at least one stabilizer unit selected from the group consisting of: $C_{1-4}$ alkoxy polyethylene glycol acrylate, $C_{1-4}$ alkoxy polyethylene glycol methacrylate, $C_{1-4}$ alkoxy polyethylene co-propylene acrylate ester, and $C_{1-4}$ alkoxy polyethylene co-propylene methacrylate ester; where the backbone comprises up to 30% by weight of non-functional structural units and at least 70% by weight in total of said stabilizer units and functional unit, where the functional units are: (a) styrene units where the styrene is substituted or unsubstituted styrene; (b) hydroxy group-containing units, and (c) carboxyl group-containing units, such that the molar proportion per one mole of hydroxy units are from 0.1 to 26.1 moles of carboxyl units, from 0.28 to 25 moles of styrene units, and from 0.8 to 66.1 moles propylene-oxy or ethylene-oxy groups, respectively, disclosed in JP-A No. 6-100642.

The copolymer (ii) preferably has approximately 2 to 3,000 of the pigment affinity groups in one molecule thereof. Dispersion stability may be insufficient when the number of the groups is less than 2, while handling of the copolymer may become difficult due to too high viscosity and chromaticity may decrease since the particle diameter distribution of the colloid particles may be broad when the number of the groups exceeds 3,000. The number of the pigment affinity groups is more preferably in a range of approximately 25 to 1,500.

The copolymer (ii) preferably has a number average molecular weight of approximately 2,000 to 1,000,000. Dispersion stability may be insufficient when the molecular weight is less than 2,000, while handling of the copolymer may become difficult due to too high viscosity and chromaticity decreases since the particle diameter distribution of the colloid particles may be broad when the molecular weight exceeds 1,000,000. The number average molecular weight is more preferably in a range of approximately 4,000 to 500,000.

While the linear polymer (iii) having the pigment affinity portions comprising the pigment affinity groups at one terminal of the main chain has one or plural pigment affinity portions comprising the pigment affinity groups only at one end of the main chain, the polymer may have sufficient affinity to the surface of the pigment.

The linear polymer (iii) is not particularly restricted. Examples of the polymer include an A-B block polymer in which one of the block is basic as disclosed in JP-A No. 46-7294; an A-B block polymer in which an aromatic carboxylic acid is introduced into A-block as disclosed in U.S. Pat. No. 4,656,226; an A-B block polymer in which one end is a basic functional group as disclosed in U.S. Pat. No. 4,032,698; an A-B block polymer in which one end is an acidic functional group as disclosed in U.S. Pat. No. 4,070,388; and a polymer improved in weather resistance and anti-yellowing of an A-B block polymer disclosed in U.S. Pat. No. 4,656,226 by introducing an aromatic carboxylic acid into A-block thereof as disclosed in JP-A No. 1-204914.

The linear polymer (iii) preferably has approximately 2 to 3,000 of the pigment affinity groups in one molecule. Dispersion stability may be insufficient when the number of the groups is less than 2, while handling of the copolymer may become difficult due to too high viscosity and chromaticity may decrease since the particle diameter distribution of the colloid particles may be broad when the number of the groups exceeds 3,000. The number of the pigment affinity groups is more preferably in a range of approximately 5 to 1,500.

The linear polymer (iii) preferably has a number average molecular weight of approximately 1,000 to 1,000,000. Dispersion stability may be insufficient when the molecular weight is less than 1,000, while handling of the copolymer may become difficult due to too high viscosity and chromaticity may decrease since the particle diameter distribution of the colloid particles may be broad when the molecular weight exceeds 1,000,000. The number average molecular weight is more preferably in a range of approximately 2,000 to 500,000.

Commercially available pigment dispersant having a high molecular weights may be used. Examples of the commercially available pigment dispersant having a high molecular weight include SOLSPERSE® 20000, SOLSPERSE® 24000, SOLSPERSE® 26000, SOLSPERSE® 27000 and SOLSPERSE® 28000 (manufactured by Zeneca Co.); DISPERBYK®-160, DISPERBYK®-161, DISPERBYK®-162, DISPERBYK®-163, DISPERBYK®-166, DISPERBYK®-170, DISPERBYK®-180, DISPERBYK®-182, DISPERBYK®-184 and DISPERBYK®-190 (manufactured by BYK Chemie Co.); EFKA-46, EFKA-47, EFKA-48 and EFKA-49 (trade names, manufactured by EFKA Chemical Co.); POLYMER 100, POLYMER 120, POLYMER 150, POLYMER 400, POLYMER 401, POLYMER 402, POLYMER 403, POLYMER 450, POLYMER 451, POLYMER 452 and POLYMER 453 (trade names, manufactured by EFKA Chemical Co.); AJISPER PB-711, AJISPER PA-111, AJISPER PB-811 and AJISPER PW-911 (trade names, manufactured by Ajinomoto Co.); FLOREN DOPA-158, FLOREN DOPA-22, FLOREN DOPA-17, FLOREN TG-730W, FLOREN G-700 and FLOREN TG-720W (trade names, manufactured by Kyoeisha Chemical Co., Ltd).

Since the pigment dispersant having a high molecular weight is a polymer with a graft structure having the pigment affinity groups on the side chain and having side chains constituting the solvation portions (polymer (i) with the comb-like structure), and a polymer having the pigment affinity groups on the main chain (the copolymer (ii) and liner polymer (iii)), dispersibility of the colloid particles is good and the polymer is suitable as a protective colloid for the metal colloid particles. A dispersion of the metal colloid particles containing a high concentration of the metal colloid particles may be obtained by using the pigment dispersant having a high molecular weight.

The pigment dispersant having a high molecular weight used in the invention preferably has a softening temperature of approximately 30° C. or more. The metal solid sol may form blocks during storage when the softening temperature is lower than 30° C. The softening temperature is preferably approximately 40° C. or higher.

The content of the pigment dispersant having a high molecular weight is preferably in a range of approximately 20 to 1,000 parts by weight relative to 100 parts by weight of the metal colloid particles. Dispersibility of the metal colloid particles may be insufficient when the content is less than 20 parts by weight, while a large amount of the pigment dispersant having a high molecular weight may be mingled into the binder resin by blending the polymer dispersant with the paint and molded resin when the content exceeds 1,000 parts by weight to thereby deteriorate chemical and physical properties. The content is more preferably in a range of approximately 50 to 650 parts by weight.

The specific charged mobile fine particles which show coloration in a dispersed state may be used singly or in combination of two or more thereof.

Conventionally-known charged mobile fine particles may also be used as the charged mobile fine particles in the present invention in combination with the specific charged mobile fine particles which show coloration in a dispersed state. Examples of the conventionally-known charged mobile fine particles include: conductive materials (such as platinum, palladium or alloys of any of these, ruthenium, rhodium and iridium);

inorganic materials (such as titanium oxide, titanium dioxide, zinc oxide, silica, yellow iron oxide, titan yellow, brown iron oxide, cobalt green, cobalt chrome green, titanium cobalt green, iron blue, cobalt blue, ultramarine, cerulean blue, cobalt aluminum chrome blue, cobalt violet, carbon black, iron black, alumina white, manganese ferrite black, cobalt ferrite black, titan black, aluminum powder, black low-oxidized titan, copper powder, tin powder, or zinc powder);

organic materials (such as azo pigments, poly-condensed azo pigments, metal complex azo pigments, phthalocyanine pigments, quinacrydone pigments, anthraquinone pigments, pyranthron pigments, dioxazine pigments, perylene pigments or the like, and more specific examples thereof include disazo yellow, condensed azo yellow, rhodamine 6G lake, anthraquinolyl red, perylene red, perylene maroon, quinacrydone maroon, quinacridone scarlet red, quinacrydone red, phthalocyanine green, phthalocyanine blue, rhodamine B lake, dioxazine violet, naphthol violet and the like); dyes (such as phthalocyanine dyes, azo dyes, or anthraquinone dyes);

polymers (such as styrene polymers, styrene-acryl polymers, methyl methacrylate polymers, methacrylate polymers, ethyl methacrylate polymers, ethyl acrylate polymers, n-butyl acrylate polymers, acrylic acid polymers, acryl gum-methacrylate polymers, nylon polymers, silicone polymers, urethane polymers, melamine polymers, vinylidene chloride polymers, quaternary pyridinium salt polymers, cellulose or the like; and more specific examples thereof include polyester, polymethacrylate, polyarylate, polymethyl methacrylate, polymethyl acrylate, polyethyl methacrylate, polyethyl acrylate, polystyrene, nylon, urethane resins, and melamine resins);

commercially-available particles (such as MICROPEARL (trade name, manufactured by Sekisui Chemical Co., Ltd.), EPOCOLOR (trade name, manufactured by Nippon Shokubai Co., Ltd.), CHEMISNOW (trade name, manufactured by Soken Kagaku Co., Ltd.), or TECHPOLYMER (trade name, manufactured by Sekisui Plastics Co., Ltd.);

powders formed by crushing and coloring resin solids comprising any of these; mixtures of any of these and additives such as dispersing agents; and capsulated powders comprising any of these and resins.

Display Medium

A display medium according to the invention preferably has a plurality of dimmer unit cells containing the dimmer layer.

The dimmer unit cell includes a dimmer layer that is constituted by movably sealing the charged mobile fine particles in a gap between a pair of opposed substrates and an electric field forming unit that forms an electric field in the dimmer layer to move the charged mobile fine particles sealed in the dimmer layer by means of the electric field.

The size of the light control unit cell is closely related to resolution of the display element, and the smaller cells may allow a high-resolution display element to be manufactured. The size is usually in the range of approximately 10 μm to 1 mm.

The display medium of the invention will be explained below with reference to FIGS. 1 to 4. In the description of drawings hereinafter, members having the same function is given the same reference numerals throughout the drawings, and detailed description thereof are omitted.

In FIGS. 1A through 1C, an example of a display medium according to the invention is shown.

As shown in FIG. 1A, the display medium 10 is structured to include a plurality of dimmer unit cells 12 that contain at least a back substrate 14, a front substrate 22 that faces the back substrate 14 with a gap therebetween and a dimmer layer 30.

On the back substrate 14, a first electrode 16, an insulating layer 18 and a dimmer layer 30 are layered in this order.

The dimmer layer 30 is a region formed by surrounding it with the insulating layer 18, gap members 24 and the front substrate 22 and structured by a dispersion liquid that includes two kinds of charged mobile fine particles 26A and 26B that respectively have different mobility and show different colorations in a dispersed state, and an insulating liquid 28.

At an external periphery end of the dimmer layer 30, so as to be layered on the insulating layer 18, a second electrode 20 is disposed in a line extended along a boundary direction of the gap member 24 and the insulating layer 18.

To the first electrode 16 and the second electrode 20, a voltage input portion 32 that inputs a voltage between the first electrode 16 and the second electrode 20 to form an electric field in the dimmer layer 30 is connected so as to be capable of receiving and transmitting a signal. The first electrode 16 and the second electrode 20 correspond to an electric field forming unit of a display medium according to the invention.

Among the surface substrate 22 and the back surface substrate 14, at least the surface substrate is formed of transparent substrates.

A film or plate substrate of a polymer such as polyester (for example, polyethylene terephthalate), polyimide, methyl methacrylate, polystyrene, polypropylene, polyethylene, polyamide, nylon, polyvinyl chloride, polyvinylidene chloride, polycarbonate, polyether sulfone, silicone resin, polyacetal resin, fluorinated resin, cellulose derivatives and polyolefin; and inorganic substrates such as glass substrate, metal substrate and ceramic substrate are preferably used for the transparent substrates. It is preferable that the transparent substrate has a light transmittance (for visible light) of at least approximately 50% or more when the element is used as a light permeable optical element.

The material for forming the insulating layer 18 is not particularly limited and utilizable examples thereof include conventionally known insulating materials such as acrylic resins, polyimide resins, or amorphous fluoro resins.

Known resin materials can be used as the material of the gap member 24, without being particularly limited, while from the point of view of manufacture, a photosensitive resin is preferably used. The gap member 24 and the electrode can be structured of the same member. In such a case, the gap member 24 may be formed of a material that constitutes the first electrode 16 and the second electrode 20.

The width (the length in a direction orthogonal to the layering direction of the gap member 24) of the gap member 24 is not particularly limited, while in general, a smaller width is more effective from the viewpoint of the resolution of the display device. Normally, approximately 1 μm to 1 mm is preferable.

The height of the gap member 24, that is, the layer thickness of the dimmer layer 30, is appropriately determined depending on the size, weight and the coloration of the display medium 10 being produced and is generally in the range of approximately 2 to 1000 μm.

The foregoing members and the respective layers are adhered via adhesive layers omitted from the drawings. The materials of the adhesive layers are not particularly limited, and thermosetting resins and UV-curable resins can be used, while a material that does not adversely affect the material of the gap member 24 and the materials of the various members constituting the display medium 10 such as the insulating liquid 28 contained in the dimmer layer 30, is selected.

As the first electrode 16 and the second electrode 20, a transparent electrode having light transmittance (visible light) of at least 50% or more is used. Specifically, a layer of a metal oxide such as tin oxide-indium oxide (ITO), tin oxide or zinc oxide is preferably used. Furthermore, when an electrode is formed, these materials may be used singly or a plurality of kinds of the materials may be layered. The thickness and magnitude of the first electrode 16 and the second electrode 20 are not particularly limited, and can vary depending on the display media 10.

As the at least two kinds of charged mobile fine particles 26 contained in the dimmer layer 30, charged mobile fine particles 26A and charged mobile fine particles 26B that show different colors in a dispersed state and have different mobility can be cited as an example.

As a method of preparation such that the mobility may be different for the respective charged mobile fine particles 26 that show different colors in a dispersed state, as mentioned above, the kind, the concentration and the stirring time period of the surfactant structuring the charged mobile fine particles and the surface processing agent of the charged mobile fine particles are appropriately controlled, and thereby charged mobile fine particles 26A and charged mobile fine particles 26B having different mobility can be prepared.

Next, an example of an action in the dimmer layer 30 of the display medium 10 in the invention will be described.

A case is explained in which, in the example shown in FIGS. 1A through 1C, the difference in mobility between the charged mobile fine particles 26A and charged mobile fine particles 26B contained in the dimmer layer 30 is approximately $1\times10^{-6}$ cm$^2$/Vs or more, the charged mobile fine particles 26B have mobility of approximately $5\times10^{-6}$ cm$^2$/Vs and the charged mobile fine particles 26A have mobility of approximately $1\times10^{-6}$ cm$^2$/Vs.

Furthermore, the first electrode 16, the second electrode 20 and the insulating layer 18 are constituted of a transparent material and, as the back substrate 14, a substrate colored in advance to have a different color from the color shown when the charged mobile fine particles 26A and charged mobile fine particles 26B are respectively dispersed, is used.

The color of the charged mobile fine particles 26A in a dispersed state, the color of the charged mobile fine particles 26B in a dispersed state and the color of the back substrate 14 are preferably constituted so that the respective colors are different from each other and are any one of red (R) color, green (G) color and blue (B) color, respectively. When thus configured, by use of a dimmer unit cell having one dimmer layer, multi-color (color) display can be realized.

In an example of FIGS. 1A through 1C, for the sake of simplifying the explanation, the charged mobile fine particles 26A and charged mobile fine particles 26B are charged with the same polarity and a voltage is applied so that the second electrode 20 may be charged with a polarity opposite to that of the charged mobile fine particles 26.

In a state where the voltage input portion 32 does not apply a voltage to the first electrode 16 and the second electrode 20 and an electric field is not formed in the dimmer layer 30, as shown in FIG. 1A, each of the multiple kinds of the charged mobile fine particles 26A and charged mobile fine particles 26B contained in the dimmer layer 30 is uniformly dispersed in the dimmer layer 30.

In a state shown in FIG. 1A, when viewed from a viewing direction X, the color obtained by adding the color of the charged mobile fine particles 26A shown in a dispersed state thereof and the color of the charged mobile fine particles 26B shown in a dispersed state thereof is displayed as the color of the dimmer unit cell 12.

When a voltage is applied between the first electrode 16 and the second electrode 20 and the voltage input portion 32 controls the electric intensity formed in the dimmer layer 30 so that an electric field is formed in the dimmer layer having an intensity such that the charged mobile fine particles 26B, which have larger mobility than the charged mobile fine particles 26A, are selectively moved, as shown in FIG. 1B, the charged mobile fine particles 26B in the dimmer layer 30 move toward the second electrode 20 side.

In a state shown in FIG. 1B, the charged mobile fine particles 26A are in a dispersed state in the dimmer layer 30. Accordingly, when viewed from a viewing direction X, the color of the charged mobile fine particles 26A that is shown in a dispersed state thereof is displayed as the color of the dimmer unit cell 12.

When a voltage is applied between the first electrode 16 and the second electrode 20 and the voltage input portion 32 controls the electric intensity formed in the dimmer layer 30 so that an electric field is formed in the dimmer layer having an intensity at which both the charged mobile fine particles 26A and charged mobile fine particles 26B can be moved in the dimmer layer 30, as shown in FIG. 1C, both the charged mobile fine particles 26A and charged mobile fine particles 26B in the dimmer layer 30 move toward the second electrode 20 side.

In a state shown in FIG. 1C, the charged mobile fine particles 26A and charged mobile fine particles 26B are agglomerated on the second electrode 20 side and from the viewing direction X the color of the back substrate 14 is visible. Accordingly, the color of the back substrate 14 is displayed as the color of the dimmer unit cell 12.

Next, an embodiment of a display medium according to the invention different from the display medium 10 shown in FIGS. 1A through 1C will be described.

A display medium 40 according to an alternative embodiment is different from the display medium 10 in that, in place of the first electrode 16 disposed as a layer on the back substrate 14 as an electric field formation unit in the display medium 10, a line-like first electrode 44 is disposed at a peripheral end portion of a dimmer layer 30 so as to face, with a gap therebetween and substantially parallel to, a line-like second electrode 20 disposed the other peripheral end portion of the dimmer layer 30. Since the first electrode 44 is structured from the same material as the first electrode 16 described in FIG. 1, detailed description of the structure is omitted.

A display medium 40 according to this embodiment is constituted including a back substrate 14, a front substrate 22 facing the back substrate 14 with a gap therebetween and a plurality of dimmer unit cells 42 including a dimmer layer 30. On the back substrate 14, the dimmer layer 30 and the front substrate 22 are layered.

Except for the facts that the first electrode 16 of the display medium 10 is disposed at the other peripheral end portion of the dimmer layer 30 to the second electrode 20 as a line-like first electrode 44 and the dimmer layer 30 is directly layered on the back substrate 14 without using the insulating layer 18, the configuration of the display medium 40 is the same as that of the display medium 10 and, accordingly, detailed description thereof is omitted.

The line width of each of the first electrode 44 and the second electrode 20 is not particularly limited, while it is generally in the range of approximately 2 µm to 1 mm. The layer thickness of the first electrode 44 and the second electrode 20 in the laminating direction is not particularly limited, while it is generally in the range of approximately 10 nm to 1 µm.

Next, an example of an action in the dimmer layer 30 of the display medium 40 in the invention as is shown in FIG. 2 will be described.

A case is explained in which, in the example shown in FIGS. 2A through 2C, as are similar to those in FIGS. 1A through 1C, the difference in mobility between the charged mobile fine particles 26A and charged mobile fine particles 26B contained in the dimmer layer 30 is approximately $1 \times 10^{-6}$ cm$^2$/Vs or more, the charged mobile fine particles 26B have mobility of approximately $1 \times 10^{-5}$ cm$^2$/Vs and the charged mobile fine particles 26A have mobility of approximately $1 \times 10^{-6}$ cm$^2$/Vs.

Furthermore, as are similar to those in FIGS. 1A through 1C, the first electrode 16, as the back substrate 14, a substrate colored in advance to have a different color from the color shown when the charged mobile fine particles 26A and charged mobile fine particles 26B are respectively dispersed, is used.

The color of the charged mobile fine particles 26A in a dispersed state, the color of the charged mobile fine particles 26B in a dispersed state and the color of the back substrate 14 are preferably constituted so that the respective colors are different from each other and are any one of red (R) color, green (G) color and blue (B) color, respectively. When thus configured, by use of a dimmer unit cell having one dimmer layer, multi-color (color) display can be realized.

In an example of FIGS. 2A through 2C, for the sake of simplifying the explanation, the charged mobile fine particles 26A and charged mobile fine particles 26B are charged with the same polarity and a voltage is applied so that the second electrode 20 may be charged with a polarity opposite to that of the charged mobile fine particles 26.

In a state where the voltage input portion 32 does not apply a voltage to the first electrode 44 and the second electrode 20 and an electric field is not formed in the dimmer layer 30, as shown in FIG. 1A, each of the multiple kinds of the charged mobile fine particles 26A and charged mobile fine particles 26B contained in the dimmer layer 30 is uniformly dispersed in the dimmer layer 30.

In a state shown in FIG. 2A, when viewed from a viewing direction X, the color obtained by adding the color of the charged mobile fine particles 26A shown in a dispersed state thereof and the color of the charged mobile fine particles 26B shown in a dispersed state thereof is displayed as the color of the dimmer unit cell 42.

When a voltage is applied between the first electrode 44 and the second electrode 20 and the voltage input portion 32 controls the electric intensity formed in the dimmer layer 30 so that an electric field is formed in the dimmer layer having an intensity such that the charged mobile fine particles 26B, which have larger mobility than the charged mobile fine particles 26A, are selectively moved, as shown in FIG. 2B, the charged mobile fine particles 26B in the dimmer layer 30 move toward the second electrode 20 side.

In a state shown in FIG. 2B, the charged mobile fine particles 26A are in a dispersed state in the dimmer layer 30. Accordingly, when viewed from a viewing direction X, the color of the charged mobile fine particles 26A that is shown in a dispersed state thereof is displayed as the color of the dimmer unit cell 42.

When a voltage is applied between the first electrode 44 and the second electrode 20 and the voltage input portion 32 controls the electric intensity formed in the dimmer layer 30 so that an electric field is formed in the dimmer layer having an intensity at which both the charged mobile fine particles 26A and charged mobile fine particles 26B can be moved in the dimmer layer 30, as shown in FIG. 2C, both the charged mobile fine particles 26A and charged mobile fine particles 26B in the dimmer layer 30 move toward the second electrode 20 side.

In a state shown in FIG. 2C, the charged mobile fine particles 26A and charged mobile fine particles 26B are agglomerated on the second electrode 20 side and from the viewing direction X the color of the back substrate 14 is visible. Accordingly, the color of the back substrate 14 is displayed as the color of the dimmer unit cell 42.

In FIGS. 2A through 2C, a case where, when an electric field is formed in the dimmer layer 30, the charged mobile fine particles 26B or both the charged mobile fine particles 26A and the charged mobile fine particles 26B are moved toward the second electrode 20, was described. However, a voltage may be applied to the first electrode 44 and the second electrode 20 so as to move the particles toward the first electrode 44.

As described above, when the electric intensity formed in the dimmer layer 30 is controlled by means of an electric field application unit of the voltage application portion 32, the charged mobile fine particles 26B, which are one of the two kinds of the charged mobile fine particles 26, can be moved toward the second electrode 20 side and the other kind of the charged mobile fine particles 26 can be dispersed in the dimmer layer 30.

Furthermore, when the electric intensity formed in the dimmer layer 30 is controlled by use of the electric field application unit of the voltage application portion 32 and thereby both of the two kinds of the charged mobile fine particles 26 are moved toward the second electrode 20, the color of the back substrate 14 is visible.

When thus only a specified kind of the two kinds of the charged mobile fine particles 26 is in an agglomerated state and the other kind of the charged mobile fine particles 26 is dispersed in the dimmer layer 30, the colors that are shown in dispersed states of the respective kinds of the charged mobile fine particles 26 dispersed in the dimmer layer 30 can be displayed as the color of a dimmer unit cell 42 or the dimmer unit cell 12, and thereby in the dimmer unit cell 42 or the dimmer unit cell 12 having a dimmer layer 30, multi-color (color) display can be realized.

Furthermore, multi-color (color) display can be realized in one pixel by providing multiple dimmer unit cells 12 or dimmer unit cells 42 to correspond to respective pixels of an image when the image is displayed on the display medium 10 or the display medium 40.

In FIGS. 1A through 1C and 2A through 2C, cases are described where the dimmer layer 30 contains two kinds of the charged mobile fine particles 26 that are respectively different in terms of mobility and color shown in the dispersed state. However, as long as respective kinds of the charged mobile fine particles 26 are different in terms of color shown in the dispersed state and mobility, three or more kinds of the charged mobile fine particles 26 may be included.

For instance, when three kinds of charged mobile fine particles 26 are contained in a dimmer layer 30, the charged mobile fine particles 26 are preferably constituted so that, for instance, mobility differs by $1 \times 10^{-6}$ cm$^2$/Vs or more between kinds nearest in mobility and the colors shown in a dispersed state of the respective kinds may be any one of red (R), green (G) and blue (B). When thus configured, in a dimmer unit cell 42 or 12 having one dimmer layer 30, multi-color (color) display can be realized.

Specifically, as is shown in FIGS. 3A through 3C, a display medium 50 is constituted including a back substrate 14, a front substrate 22 facing the back substrate 14 with a gap therebetween and a dimmer unit cell 52 including a dimmer layer 31.

On the back substrate 14, the first electrode 16, the insulating layer 18, and the dimmer layer 31 are layered in this order.

The dimmer layer 31 is a region formed by surrounding it with the insulating layer 18, gap members 34 and the front substrate 22 and structured by a dispersion liquid that includes three kinds of charged mobile fine particles 26A, 26B and 26C that respectively have different mobility and show different colorations in a dispersed state, and an insulating liquid 28.

Since a display medium 50 shown in FIGS. 3A through 3D has the same configuration as the display medium 10 shown in FIGS. 1A through 1C except that while the display medium 10 shown in FIGS. 1A through 1C includes two kinds of the charged mobile fine particles 26 (26A, 26B), the display medium 50 shown in FIGS. 3A through 3D has a dimmer layer 31 in place of the dimmer layer 30 and contains three kinds of the charged mobile fine particles 26 (26A, 26B and 26C) in the dimmer layer 31, detailed description thereof is omitted.

Next, an example of an action in the dimmer layer 31 of the display medium 50 shown in FIGS. 3A through 3C in the invention will be described.

A case is explained in which, in the example shown in FIGS. 3A through 3C, the charged mobile fine particles 26B and charged mobile fine particles 26C contained in the dimmer layer 31 are negatively charged, and the charged mobile fine particles 26A are positively charged.

Further, the charged mobile fine particles 26B have mobility of approximately $5 \times 10^{-6}$ cm$^2$/Vs, the charged mobile fine particles 26C have mobility of approximately $1 \times 10^{-6}$ cm$^2$/Vs, and the charged mobile fine particles 26A have mobility of approximately $9 \times 10^{-6}$ cm$^2$/Vs.

In a state where the voltage input portion 32 does not apply a voltage to the first electrode 16 and the second electrode 20 and an electric field is not formed in the dimmer layer 31, as shown in FIG. 3A, each of the multiple kinds of the charged mobile fine particles 26A, charged mobile fine particles 26B and charged mobile fine particles 26C contained in the dimmer layer 31 is uniformly dispersed in the dimmer layer 31.

In a state shown in FIG. 3A, when viewed from a viewing direction X, the color obtained by adding the color of the charged mobile fine particles 26A shown in a dispersed state thereof, the color of the charged mobile fine particles 26B shown in a dispersed state thereof and the color of the charged mobile fine particles 26C shown in a dispersed state thereof is displayed as the color of the dimmer unit cell 52.

Namely, in a state shown in FIG. 3A, white color due to additive color process of red (R), green (G) and blue (B) is displayed as the color of the dimmer unit cell 52.

When a voltage is applied between the first electrode 16 and the second electrode 20 and the voltage input portion 32 controls the electric intensity formed in the dimmer layer 31 so that an electric field is formed in the dimmer layer having an intensity such that the charged mobile fine particles 26B are selectively moved, and electric voltage is applied to the first electrode 16 and the second electrode 20 so that the second electrode 20 side becomes a positive electrode, as shown in FIG. 3B, the charged mobile fine particles 26B in the dimmer layer 31 move toward the second electrode 20 side.

In a state shown in FIG. 3B, the charged mobile fine particles 26A and the charged mobile fine particles 26C are in a dispersed state in the dimmer layer 31. Accordingly, when viewed from a viewing direction X, the color cyan (C) obtained by adding the color of the charged mobile fine particles 26A shown in a dispersed state thereof (blue (B)) and the color of the charged mobile fine particles 26C shown in a dispersed state thereof (green (G)) is displayed as the color of the dimmer unit cell 52.

When a voltage is applied between the first electrode 16 and the second electrode 20 and the voltage input portion 32 controls the electric intensity formed in the dimmer layer 31 so that an electric field is formed in the dimmer layer having an intensity such that both of the charged mobile fine particles 26B and the charged mobile fine particles 26C are moved, and electric voltage is applied to the first electrode 16 and the second electrode 20 so that the second electrode 20 side becomes a positive electrode, as shown in FIG. 3C, the charged mobile fine particles 26B and the charged mobile fine particles 26C in the dimmer layer 31 move toward the second electrode 20 side.

In a state shown in FIG. 3C, the charged mobile fine particles 26A are in a dispersed state in the dimmer layer 31. Accordingly, when viewed from a viewing direction X, the color of the charged mobile fine particles 26A that is shown in a dispersed state thereof (blue (B)) is displayed as the color of the dimmer unit cell 52.

On the other hand, when a voltage is applied between the first electrode 16 and the second electrode 20 and the voltage input portion 32 controls the electric intensity formed in the dimmer layer 31 so that an electric field is formed in the dimmer layer having an intensity such that the charged mobile fine particles 26A are selectively moved, and electric voltage is applied to the first electrode 16 and the second electrode 20 so that the second electrode 20 side becomes a negative electrode, as shown in FIG. 3D, the charged mobile fine particles 26A in the dimmer layer 31 move toward the second electrode 20 side.

In a state shown in FIG. 3D, the charged mobile fine particles 26B and the charged mobile fine particles 26C are in a dispersed state in the dimmer layer 31. Accordingly, when viewed from a viewing direction X, the color yellow (Y)

obtained by adding the color of the charged mobile fine particles 26B shown in a dispersed state thereof (red (R)) and the color of the charged mobile fine particles 26C shown in a dispersed state thereof (green (G)) is displayed as the color of the dimmer unit cell 52.

As is explained above, by controlling an electric intensity formed in the dimmer layer 31 by use of the electric field application unit of the voltage application portion 32, the state in which at least one kind of a plurality of kinds of the charged mobile fine particles 26 are moved toward the second electrode 20 and other two kinds of the charged mobile fine particles 26 are being in a dispersed state in the dimmer layer 30 is thereby achieved.

Thus, when only a specified kind of the plurality of kinds of the charged mobile fine particles 26 is agglomerated and the other kinds of the charged mobile fine particles 26 are dispersed in the dimmer layer 31, a color obtained by additive-mixing of the colors shown in dispersed states of the respective kinds of charged mobile fine particles dispersed in the dimmer layer can be displayed as the color of a dimmer unit cell 52, and thereby, in a dimmer unit cell 52 having a dimmer layer 31, multi-color (color) display can be realized.

Furthermore, when the dimmer unit cell 52 is disposed corresponding to each pixel of an image displayed by the display medium 50, multi-color (color) display in one pixel can be realized.

The display medium according to the invention may be configured so that a plurality of the above-described dimmer unit cells 12, dimmer unit cells 42 or dimmer unit cells 52 may respectively be arranged in a direction along a substrate surface of a back substrate so that the same back substrate 14 is used for all the cells, and arranged so as to correspond to respective pixels when an image is displayed on a display medium.

Figure 5:
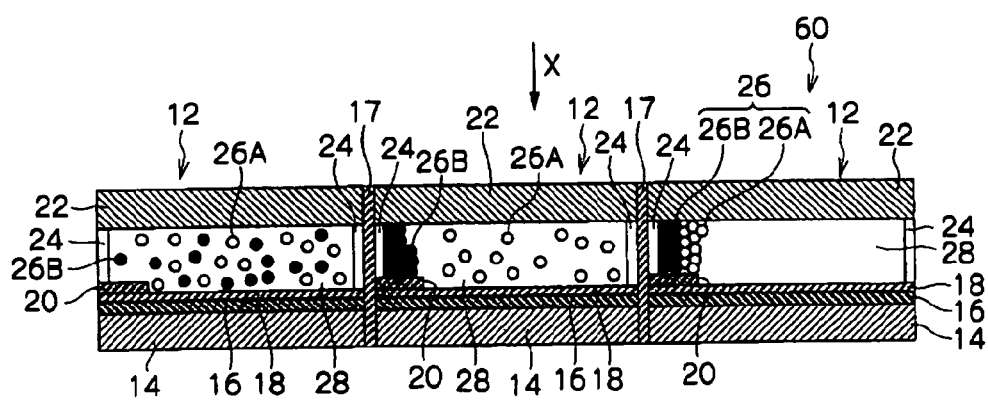
FIG. 5 is a schematic diagram showing an example where a display medium according to the invention has a configuration where dimmer unit cells are arranged in a direction along plate faces of rear substrates.

Specifically, as shown in FIG. 5, a display medium 60 may have a configuration where the dimmer unit cells 12 shown in FIGS. 1A through 1C are arranged in a direction along a substrate surface of a back substrate 14 via an insulating layer 18. Though omitted from FIG. 5, it is assumed that to each of the first electrodes 16 and the second electrodes 20 of the respective dimmer unit cells 12 a voltage application portion 32 is connected so that voltage can be applied.

Furthermore, a display medium according to the invention may have a configuration where the above-described dimmer unit cell 12, dimmer unit cell 42 or dimmer unit cell 52 is formed in a plurality of layers for each pixel corresponding to the respective pixels when an image is displayed on a display medium 70.

Specifically, as shown in FIG. 4, the display medium 70 may be configured with the dimmer unit cells 12 shown in FIGS. 1A through 1C layered on the back substrate 14.

Furthermore, with a configuration where the dimmer unit cells 12 shown in FIGS. 1A through 1C are layered on the back substrate 14 as one pixel, as shown in FIG. 4, the layered configurations may be arranged in a direction along a substrate surface of the back substrate.

In FIGS. 5 and 4, a case where a voltage application portion 32 is disposed for each of the dimmer unit cells 12 has been described. However, one voltage application portion 32 can be provided at the display medium 70 or the display medium 60 to control the voltage application for each of the plurality of dimmer unit cells 12 contained in the display medium 70 or the display medium 60.

When the dimmer unit cells 12 are structured in layers in this way, the display medium according to the invention can realize full-color display for each of the pixels.

As described above, according to the display medium according to the present invention, when at least two kinds of charged mobile fine particles that respectively have different mobility and show different coloration in a dispersed state are contained in the dimmer layer and an electric field with a given intensity is formed in the dimmer layer, the charged mobile fine particles with larger mobility travel at a higher speed in the dimmer layer than the charged mobile fine particles with smaller mobility.

Accordingly, when charged mobile fine particles that move readily in accordance with the electric intensity and charged mobile fine particles that move with difficulty are contained in the same dimmer layer, when the electric intensity is varied to selectively move the charged mobile fine particles, the charged mobile fine particles dispersed in the dimmer layer can be controlled, and thereby the display medium according to the invention can be rendered a display medium capable of displaying in full color with high resolution.

Specifically, when an electric intensity formed in the dimmer layer by use of the electric field application unit of the voltage application portion 32 is controlled to move at least one kind of a plurality of kinds of the charged mobile fine particles 26 toward the second electrode 20, the kind of the charged mobile fine particles 26 dispersed in the dimmer layer 30 is thereby controlled.

Thus, when only a specified kind of the plurality of kinds of the charged mobile fine particles 26 is agglomerated and the other kinds of the charged mobile fine particles 26 are dispersed in the dimmer layer, a color obtained by mixing the colors shown in dispersed states of the respective kinds of charged mobile fine particles dispersed in the dimmer layer can be displayed as the color of a dimmer unit cell, and thereby, in a dimmer unit cell having a dimmer layer, multi-color (color) display can be realized.

Furthermore, when the dimmer unit cell is disposed corresponding to one pixel, multi-color (color) display in one pixel can be realized.

Some embodiments of the invention are outlined below, while the invention is not restricted thereby.

According to an aspect of the invention, a display medium comprises a display medium comprising a dimmer layer which comprises at least two kinds of charged mobile fine particles, wherein each of the at least two kinds of the charged mobile fine particles respectively has different coloration and a different mobility, and the charged mobile fine particles of at least one kind of the at least two kinds show coloration when in a dispersed state. In this aspect, a difference in mobility between respective kinds of the at least two kinds of the charged mobile fine particles may be approximately $1 \times 10^{-6}$ cm$^2$/Vs or more. Respective kinds of the at least two kinds of the charged mobile fine particles may show coloration of one of red, green and blue in a dispersed state. The charged mobile fine particles may be dispersed in a polymer resin. The charged mobile fine particles that show coloration when in a dispersed state may be metal colloidal particles having the color strength due to the surface plasmon resonance. The metal colloidal particles may be gold colloids or silver colloids. The volume average diameter of the charged mobile fine particles may be in a range of approximately 1 to 100 nm. The volume average diameter of the charged mobile fine particles may be in a range of approximately 2 to 50 nm. A plurality of dimmer unit cells may be layered on a rear substrate, and each of the plurality of dimmer unit cells may comprise the dimmer layer. Further, a plurality of dimmer unit cells may be arranged in a direction along a plate face of a rear substrate, and each of the plurality of dimmer unit cells may comprise the dimmer layer.

According to another aspect of the invention, a display device comprises a dimmer layer and an electric field forming unit which forms an electric field in the dimmer layer, wherein the dimmer layer comprises at least two kinds of charged mobile fine particles, each of the at least two kinds of the charged mobile fine particles respectively has different coloration and a different mobility, and the charged mobile fine particles of at least one kind of the at least two kinds show coloration when in a dispersed state. In this aspect, the electric field forming unit may form an electric field in which an electric intensity of the electric field is controlled according to the kinds of the charged mobile fine particles. The electric field forming unit may comprise a pair of electrodes. At least one electrode of the pair of electrodes may be formed at a peripheral end portion of the dimmer layer. A difference in mobility between respective kinds of the at least two kinds of the charged mobile fine particles may be approximately $1\times10^{-6}$ cm$^2$/Vs or more. Respective kinds of the at least two kinds of the charged mobile fine particles may show coloration of one of red, green or blue in a dispersed state. The charged mobile fine particles may be dispersed in a polymer resin. The charged mobile fine particles that show coloration when in a dispersed state may be metal colloidal particles having the color strength due to the surface plasmon resonance. The metal colloidal particles may be gold colloids or silver colloids. The volume average diameter of the charged mobile fine particles may be in a range of approximately 1 to 100 nm. A plurality of dimmer unit cells may be layered on a rear substrate, and each of the plurality of dimmer unit cells may comprise the dimmer layer. Further, a plurality of dimmer unit cells may be arranged in a direction along a plate face of a rear substrate, and each of the plurality of dimmer unit cells may comprise the dimmer layer.

According to another aspect of the invention, a display method comprises putting all charged mobile fine particles in a display medium comprising a dimmer layer comprising at least two kinds of the charged mobile fine particles in a dispersed state; and keeping at least one kind of the at least two kinds of the charged mobile fine particles in a dispersed state and putting another kind of the at least two kinds of the charged mobile fine particles in a non-dispersed state, wherein each of the at least two kinds of the charged mobile fine particles respectively has different coloration and a different mobility, and the charged mobile fine particles of at least one kind of the at least two kinds show coloration when in a dispersed state. In this aspect, the method may further comprise putting all of the charged mobile fine particles in a non-dispersed state. Further, each of the at least two kinds of the charged mobile fine particles may respectively show different coloration when in a dispersed state.

EXAMPLES

While examples of the invention will be explained in more detail with reference to examples, the invention is not restricted by these examples.

Example 1

One example of a display medium 10 of the invention will be described along with FIG. 1.

At first, as a first electrode 16, an ITO layer is formed to be of 50 nm thickness by sputtering method on a back surface substrate 14 made of a polyethylene terephthalate (PET) having a 200 μm thickness, the and ITO layer is patterned in line-like state (line width: 300 μm). Next, an acrylic resin layer (thickness: 0.1 μm) as an insulating layer 18 is formed.

Next, as a second electrode 20, an aluminum layer is formed to be of 50 nm thickness by vacuum evaporation method and is subjected to line patterning by photolithographic method and dry etching method. The line width is about 30 μm.

Successively, layers for partitioning walls are formed using a photosensitive polyimide varnish, exposed and etched by wet etching so as to form gap members 24 having a height of 50 μm and a width of 20 μm.

After a thermally fusible adhesion layer is formed on the joint faces of the gap members 24 and the surface substrate 22, distilled water 28 containing the following tow kinds of particles is filled between the gap members 24, and then the surface substrate 22 made of PET is heated to join the joint faces and produce a display medium 10 (refer to FIG. 3).

Preparation of Gold Colloid Particles 26A

A mixed solution of 1 ml of 1 weight percent chlorauric acid and 79 ml of distilled water is kept at 60° C. and a mixed solution of 4 ml of 1 weight percent citric acid and 4 ml of 1 weight percent tannic acid is added thereto while stirring. Thereafter, after heating at 100° C. for 10 min, the solution is concentrated to 0.1 weight percent as a gold concentration, and thereby an aqueous solution in which gold colloid particles are dispersed is prepared. The thus prepared gold colloid particles have a volume-average particle diameter of 10 nm and mobility of $1.1\times10^{-6}$ cm$^2$/Vs and show red color as the color in a dispersed state.

Preparation of Gold Colloid Particles 26B

A mixed solution of 1 ml of 1 weight percent chlorauric acid and 79 ml of distilled water is kept at 60° C. and a mixed solution of 4 ml of 1 weight percent citric acid and 4 ml of 1 weight percent tannic acid is added thereto while stirring. Thereafter, after heating at 100° C. for 30 min, the solution is concentrated to 0.1 weight percent as a gold concentration, and thereby an aqueous solution in which gold colloid particles are dispersed is prepared. The thus prepared gold colloid particles have a volume-average particle diameter of 35 nm and mobility of $5.1\times10^{-6}$ cm$^2$/Vs and show blue color as the color in a dispersed state.

That is, the difference in mobility of the gold colloid particles 26A and the gold colloid particles 26B is $4\times10^{-6}$ cm$^2$/Vs.

Both the gold colloid particles 26A and the gold colloid particles 26B are negatively charged in a state sealed in the dimmer layer 30.

The mobility of the respective particles is evaluated by observing with a VHX-200 (trade name, manufactured by KEYENCE Corporation) the color variation accompanying the movement of particles when a voltage of 3V is applied to a first electrode 16 and a second electrode 20 in the display media 10 produced by sealing the respective kinds of particles in the dimmer layer 30.

In the display medium 10 thus prepared, in a state where a voltage is not applied to the first electrode 16 and the second electrode 20, as shown in FIG. 1A, since the gold colloid particles 26A and the gold colloid particles 26B are both in a dispersed state, when viewed from the viewing direction X, a color (purple) obtained by mixing the red color of the gold colloid particles 26A shown in a dispersed state and the blue color of the gold colloid particles 26B shown in a dispersed state is visible as the color of the display medium 10.

To the first electrode 16 and the second electrode 20 of the display medium 10, a voltage of 2V is applied, which is an amount of voltage large enough to move the gold colloid particles 26B with large mobility toward the second electrode 20 side but not to move the gold colloid particles 26A toward the second electrode 20 side. Here, the voltage is applied so that the first electrode 16 is negative.

When a voltage with this voltage value is applied to the first electrode 16 and the second electrode 20, the gold colloid particles 26B in the dimmer layer 30 move toward the second electrode 20 side, and thereby a state where the gold colloid particles 26A are dispersed in the dimmer layer 30 is observed (FIG. 1B).

Thereby, in the display medium 10, a color (red) shown in a dispersed state of the gold colloid particles 26A is observed.

Furthermore, a voltage of 3V is applied to the display medium 10 so that all particles of both the gold colloid particles 26B and the gold colloid particles 26A may move toward the second electrode 20 side. At this time, the voltage is applied so that the first electrode 16 is negative.

When a voltage with this voltage value is applied to the first electrode 16 and the second electrode 20, both the gold colloid particles 26B and the gold colloid particles 26A are observed to move toward the second electrode 20 side. Thereby, through a transparent insulating layer 18 and the first electrode 16, a color (white) of a white back substrate 14 appears and white is observed as the color of the display medium 10.

When an alternating voltage is applied to the first electrode 16 and the second electrode 20 of the display medium in a state that shows the color of the back substrate 14, the gold colloid particles 26B and the gold colloid particles 26A are returned to a dispersed state, and thereby a color (purple) obtained by adding the colors shown in the dispersed state of the gold colloid particles 26B and the gold colloid particles 26A is displayed.

Example 2

Similarly to Example 1, another example of the display medium 10 of the invention will be described referring to FIG. 1. Example 2 is different from Example 1 in the point that the difference in mobility of the metal colloids included in the dimmer layer 30 is $1 \times 10^{-6}$ cm$^2$/Vs.

Similarly to Example 1, in Example 2, as a first electrode 16, an ITO layer is formed to be of 50 nm thickness by sputtering method on a back surface substrate 14 made of a polyethylene terephthalate (PET) having a 200 µm thickness, the and ITO layer is patterned in line-like state (line width: 300 µm). Next, an acrylic resin layer (thickness: 0.1 µm) as an insulating layer 18 is formed.

Next, as a second electrode 20, an aluminum layer is formed to be of 50 nm thickness by vacuum evaporation method and is subjected to line patterning by photolithographic method and dry etching method. The line width is about 30 µm.

Successively, layers for partitioning walls are formed using a photosensitive polyimide varnish, exposed and etched by wet etching so as to form gap members 24 having a height of 50 µm and a width of 20 µm.

After a thermally fusible adhesion layer is formed on the joint faces of the gap members 24 and the surface substrate 22, distilled water 28 containing the following two kinds of particles is filled between the gap members 24, and then the surface substrate 22 made of PET is heated to join the joint faces and produce a display medium 10 (refer to FIG. 1).

Preparation of Gold Colloid Particles 26A

To the gold colloid particles 26A prepared in Example 1, lauryl trimethyl ammonium salt is added so as to be 0.3% by weight to the gold colloid particles, followed by stirring. The thus prepared gold colloid particles are used as gold colloid particles 26A of Example 2. The thus prepared gold colloid particles 26A have a volume-average particle diameter of 10 nm, mobility of $4 \times 10^{-6}$ cm$^2$/Vs and the color in a dispersed state is red.

Preparation of Gold Colloid Particles 26B

The gold colloid particles 26B are prepared in the same manner as described in Example 1. The gold colloid particles 26B have a volume-average particle diameter of 35 nm, mobility of $5 \times 10^{-6}$ cm$^2$/Vs and the color in a dispersed state is blue.

That is, the difference in mobility of the gold colloid particles 26A and the gold colloid particles 26B is $1 \times 10^{-6}$ cm$^2$/Vs.

Both the gold colloid particles 26A and the gold colloid particles 26B are negatively charged in a state sealed in the dimmer layer 30.

In the display medium 10 thus prepared, in a state where a voltage is not applied to the first electrode 16 and the second electrode 20, as shown in FIG. 1A, since the gold colloid particles 26A and the gold colloid particles 26B are both in a dispersed state, when viewed from the viewing direction X, a color (purple) obtained by mixing the red color of the gold colloid particles 26A shown in a dispersed state and the blue color of the gold colloid particles 26B shown in a dispersed state is visible as the color of the display medium 10.

To the display medium 10, a voltage of 2V is applied, which is an amount of voltage large enough to move the gold colloid particles 26B with large mobility toward the second electrode 20 side but not to move the gold colloid particles 26A toward the second electrode 20 side. Here, the voltage is applied so that the first electrode 16 is negative.

When a voltage with this voltage value is applied to the first electrode 16 and the second electrode 20, the gold colloid particles 26B in the dimmer layer 30 move toward the second electrode 20 side, and thereby a state where the gold colloid particles 26A are dispersed in the dimmer layer 30 is observed (FIG. 1B).

Thereby, in the display medium 10, a color (red) shown in a dispersed state of the gold colloid particles 26A is observed.

Furthermore, a voltage of 3V is applied to the display medium 10 so that all particles of both the gold colloid particles 26B and the gold colloid particles 26A may move toward the second electrode 20 side. At this time, the voltage is applied so that the first electrode 16 is negative.

When a voltage with this voltage value is applied to the first electrode 16 and the second electrode 20, both the gold colloid particles 26B and the gold colloid particles 26A are observed to move toward the second electrode 20 side. Thereby, through a transparent insulating layer 18 and the first electrode 16, a color (white) of a white back substrate 14 appears and white is observed as the color of the display medium 10.

When an alternating voltage is applied to the first electrode 16 and the second electrode 20 of the display medium in a state that shows the color of the back substrate 14, the gold colloid particles 26B and the gold colloid particles 26A are returned to a dispersed state, and thereby a color (purple) obtained by adding the colors shown in the dispersed state of the gold colloid particles 26B and the gold colloid particles 26A is displayed.

Example 3

Similarly to Example 1, still another example of the display medium 10 of the invention will be described referring to FIG. 1. Example 3 is different from Example 1 in the point that the difference in mobility of the metal colloids included in the dimmer layer 30 is $0.8 \times 10^{-6}$ cm$^2$/Vs.

Similarly to Example 1, in Example 3, as a first electrode 16, an ITO layer is formed to be of 50 nm thickness by sputtering method on a back surface substrate 14 made of a polyethylene terephthalate (PET) having a 200 µm thickness, the and ITO layer is patterned in line-like state (line width: 300 µm). Next, an acrylic resin layer (thickness: 0.1 µm) as an insulating layer 18 is formed.

Next, as a second electrode 20, an aluminum layer is formed to be of 50 nm thickness by vacuum evaporation method and is subjected to line patterning by photolithographic method and dry etching method. The line width is about 30 µm.

Successively, layers for partitioning walls are formed using a photosensitive polyimide varnish, exposed and etched by wet etching so as to form gap members 24 having a height of 50 µm and a width of 20 µm.

After a thermally fusible adhesion layer is formed on the joint faces of the gap members 24 and the surface substrate 22, distilled water 28 containing the following two kinds of particles is filled between the gap members 24, and then the surface substrate 22 made of PET is heated to join the joint faces and produce a display medium 10 (refer to FIG. 1).

Preparation of Gold Colloid Particles 26A for Comparative Example 1

To the gold colloid particles 26A prepared in Example 1, lauryl trimethyl ammonium salt is added so as to be 0.6% by weight to the gold colloid particles, followed by stirring. The thus prepared gold colloid particles are used as gold colloid particles 26A of Comparative example 1. The thus prepared gold colloid particles 26A have a volume-average particle diameter of 10 nm, mobility of $4.2 \times 10^{-6}$ cm$^2$/Vs and the color in a dispersed state is red.

Preparation of Gold Colloid Particles 26B

The gold colloid particles 26B are prepared in the same manner as described in Example 1. The gold colloid particles 26B have a volume-average particle diameter of 35 nm, mobility of $5 \times 10^{-6}$ cm$^2$/Vs and the color in a dispersed state is blue.

That is, the difference in mobility of the gold colloid particles 26A and the gold colloid particles 26B is $0.8 \times 10^{-6}$ cm$^2$/Vs.

Both the gold colloid particles 26A and the gold colloid particles 26B are negatively charged in a state sealed in the dimmer layer 30.

In the display medium 10 thus prepared, in a state where a voltage is not applied to the first electrode 16 and the second electrode 20, as shown in FIG. 1A, since the gold colloid particles 26A and the gold colloid particles 26B are both in a dispersed state, when viewed from the viewing direction X, a color (purple) obtained by mixing the red color of the gold colloid particles 26A shown in a dispersed state and the blue color of the gold colloid particles 26B shown in a dispersed state is visible as the color of the display medium 10.

To the first electrode 16 and the second electrode 20 of the display medium 10, a voltage of 1.5V is applied. Here, the voltage is applied so that the first electrode 16 is negative.

When a voltage with this voltage value is applied to the first electrode 16 and the second electrode 20, both the gold colloid particles 26A and the gold colloid particles 26B maintain a dispersed state and no color variation is observed in the display medium 10.

To the first electrode 16 and the second electrode 20 of the display medium 10, a voltage of 2V is further applied. Here, the voltage is applied so that the first electrode 16 is negative.

When a voltage with this voltage value is applied to the first electrode 16 and the second electrode 20, both of the gold colloid particles 26A and 26B in the dimmer layer 30 move toward the second electrode 20 side. Thereby, through a transparent insulating layer 18 and the first electrode 16, a color (white) of a white back substrate 14 appears and white is observed as the color of the display medium 10.

Example 4

Examples 1 to 3 provide examples in which two kinds of metal colloids are included in the dimmer layer 30. Example 4 provides an example in which three kinds of metal colloids are included in the dimmer layer 30.

Example 4 provides still another example of the display medium 50 of the invention by referring to FIG. 3.

Similarly to Example 1, in Example 3, as a first electrode 16, an ITO layer is formed to be of 50 nm thickness by sputtering method on a back surface substrate 14 made of a polyethylene terephthalate (PET) having a 200 µm thickness, the and ITO layer is patterned in line-like state (line width: 300 µm). Next, an acrylic resin layer (thickness: 0.1 µm) as an insulating layer 18 is formed.

Next, as a second electrode 20, an aluminum layer is formed to be of 50 nm thickness by vacuum evaporation method and is subjected to line patterning by photolithographic method and dry etching method. The line width is about 30 µm.

Successively, layers for partitioning walls are formed using a photosensitive polyimide varnish, exposed and etched by wet etching so as to form gap members 24 having a height of 50 µm and a width of 20 µm.

After a thermally fusible adhesion layer is formed on the joint faces of the gap members 24 and the surface substrate 22, distilled water 28 containing the following three kinds of particles is filled between the gap members 24, and then the surface substrate 22 made of PET is heated to join the joint faces and produce a display medium 50 (refer to FIG. 1).

Preparation of Gold Colloid Particles 26A

A mixed solution of 1 ml of 1 weight percent chlorauric acid and 79 ml of distilled water is kept at 60° C. and a mixed solution of 4 ml of 0.005 weight percent citric acid and 4 ml of 1 weight percent tannic acid is added thereto while stirring. Thereafter, after adding sodium lauryl sulfate in an amount of 0.6 weight percent of the amount of the gold colloid and heating at 100° C. for 30 min, the solution is concentrated to 0.1 weight percent as a gold concentration, and thereby an aqueous solution in which gold colloid particles are dispersed is prepared. The thus prepared gold colloid particles have a volume-average particle diameter of 50 nm and mobility of $3.0 \times 10^{-6}$ cm$^2$/Vs and show green color as the color in a dispersed state.

Preparation of Gold Colloid Particles 26B

The gold colloid particles 26B used in Example 1 are used as the gold colloid particles 26B of Example 4. The gold colloid particles 26B have a volume-average particle diameter of 35 nm, mobility of $5.1 \times 10^{-6}$ cm$^2$/Vs and the color in a dispersed state is blue.

Preparation of Gold Colloid Particles 26C

The gold colloid particles 26A used in Example 1 are used as the gold colloid particles 26C of Example 4. The gold colloid particles 26B have a volume-average particle diameter of 10 nm, mobility of $1.1 \times 10^{-6}$ cm$^2$/Vs and the color in a dispersed state is red.

The gold colloid particles 26B and the gold colloid particles 26C are negatively charged while the gold colloid particles 26A are positively charged in a state sealed in the dimmer layer 30.

In the display medium 50 thus prepared, in a state where a voltage is not applied to the first electrode 16 and the second electrode 20, as shown in FIG. 3A, since the gold colloid particles 26A, the gold colloid particles 26B and the gold colloid particles 26C are all in a dispersed state, when viewed from the viewing direction X, a color obtained by mixing the green color of the gold colloid particles 26A shown in a dispersed state, the blue color of the gold colloid particles 26B shown in a dispersed state, and the red color of the gold colloid particles 26C shown in a dispersed state is visible as the color of the display medium 50.

To the first electrode 16 and the second electrode 20 of the display medium 50, a voltage of 2V is applied, which is an amount of voltage large enough to move the gold colloid particles 26B with the largest mobility toward the second electrode 20 side but not to move the gold colloid particles 26A and the gold colloid particles 26C toward the second electrode 20 side. Here, the voltage is applied so that the first electrode 16 is negative.

When a voltage with this voltage value is applied to the first electrode 16 and the second electrode 20, the gold colloid particles 26B in the dimmer layer 31 move toward the second electrode 20 side, and thereby a state where the gold colloid particles 26A and the gold colloid particles 26C are dispersed in the dimmer layer 31 is observed (FIG. 3B).

Thereby, in the display medium 50, a color (yellow) obtained by adding the color (red) of the gold colloid particles 26C shown in the dispersed state thereof and the color (green) of the gold colloid particles 26A shown in the dispersed state thereof is displayed.

Furthermore, to the first electrode 16 and the second electrode 20, a voltage of 3V is applied, which is an amount of voltage to form electric field in the dimmer layer 31 to move both the gold colloid particles 26B and the gold colloid particles 26C toward the second electrode 20 side. At this time, the voltage is applied so that the first electrode 16 is negative.

When a voltage with this voltage value is applied to the first electrode 16 and the second electrode 20, both the gold colloid particles 26B and the gold colloid particles 26A in the dimmer layer 31 are observed to move toward the second electrode 20 side. Thereby, since the gold colloid particles 26A become a dispersed state in the dimmer layer 31, a color (green) shown in a dispersed state of the gold colloid particles 26A is observed as the color displayed by the display medium 50.

To the first electrode 16 and the second electrode 20 of the display medium 50, a voltage of 2.5V is applied, which is an amount of voltage to form electric field to move the gold colloid particles 26A toward the second electrode 20 side. Here, the voltage is applied so that the first electrode 16 is positive.

When a voltage with this voltage value is applied to the first electrode 16 and the second electrode 20, the gold colloid particles 26A in the dimmer layer 31 are observed to move toward the second electrode 20 side. Thereby, since the gold colloid particles 26B and the gold colloid particles 26C become a dispersed state in the dimmer layer 31, a color (purple) obtained by adding the color (blue) shown in the dispersed state of the gold colloid particles 26B and the color (red) shown in the dispersed state of the gold colloid particles 26C is displayed as the color displayed by the display medium 50.

Example 5

Examples 1 to 4 provide examples in which the metal colloids included in the dimmer layer 30 or the dimmer layer 31 are gold colloids. Example 5 provides an example in which the metal colloids included in the dimmer layer 30 are silver colloids.

Similarly to Example 2, Example 5 provides still another example of the display medium 10 of the invention by referring to FIG. 1. Example 5 is different from Example 2 in the point of the kind of metal included in the dimmer layer 30.

In Example 5, as a first electrode 16, an ITO layer is formed to be of 50 nm thickness by sputtering method on a back surface substrate 14 made of a polyethylene terephthalate (PET) having a 200 μm thickness, the and ITO layer is patterned in line-like state (line width: 300 μm). Next, an acrylic resin layer (thickness: 0.1 μm) as an insulating layer 18 is formed.

Next, as a second electrode 20, an aluminum layer is formed to be of 50 nm thickness by vacuum evaporation method and is subjected to line patterning by photolithographic method and dry etching method. The line width is about 30 μm.

Successively, layers for partitioning walls are formed using a photosensitive polyimide varnish, exposed and etched by wet etching so as to form gap members 24 having a height of 50 μm and a width of 20 μm.

After a thermally fusible adhesion layer is formed on the joint faces of the gap members 24 and the surface substrate 22, distilled water 28 containing the following three kinds of particles is filled between the gap members 24, and then the surface substrate 22 made of PET is heated to join the joint faces and produce a display medium 10 (refer to FIG. 1).

Preparation of Silver Colloid Particles 26A

To 10 ml of a cyclohexane solution of silver 2-ethylhexylate (0.05% by weight), 5 ml of an ethanol solution of sodium dodecyl sulfate (0.5% by weight) is added, followed by stirring, further followed by adding 5 ml of an ethanol solution (0.02% by weight) of ascorbic acid, and still further followed by heating at 50° C. for 10 min. The thus prepared silver colloid particles are used as silver colloid particles 26A of Example 5. The thus prepared silver colloid particles 26A have a volume-average particle diameter of 5 nm, mobility of $4.2 \times 10^{-6}$ cm$^2$/Vs and a color in a dispersed state of yellow.

Preparation of Silver Colloid Particles 26B

To 10 ml of a cyclohexane solution of silver 2-ethylhexylate (0.05% by weight), 5 ml of an ethanol solution of sodium dodecyl sulfate (0.05% by weight) is added, followed by stirring, further followed by adding 5 ml of an ethanol solution of ascorbic acid (0.1% by weight), and still further followed by heating at 50° C. for 30 min. The thus prepared silver colloid particles are used as silver colloid particles 26B of Example 5. The thus prepared silver colloid particles 26B have a volume-average particle diameter of 40 nm, mobility of $5.2 \times 10^{-6}$ cm$^2$/Vs and a color in a dispersed state of red.

That is, the difference in mobility of the silver colloid particles 26A and the silver colloid particles 26B is $1.0 \times 10^{-6}$ cm$^2$/Vs.

Both the silver colloid particles 26A and the silver colloid particles 26B are negatively charged in a state sealed in the dimmer layer 30.

In the display medium 10 thus prepared, in a state where a voltage is not applied to the first electrode 16 and the second electrode 20, as shown in FIG. 1A, since the silver colloid particles 26A and the silver colloid particles 26B are both in a dispersed state, when viewed from the viewing direction X, a color (orange) obtained by mixing the yellow color of the silver colloid particles 26A shown in a dispersed state and the red color of the silver colloid particles 26B shown in a dispersed state is visible as the color of the display medium 10.

To the first electrode 16 and the second electrode 20 of the display medium 10, a voltage of 2V is applied, which is an amount of voltage large enough to move the silver colloid particles 26B with large mobility toward the second electrode 20 side but not to move the silver colloid particles 26A toward the second electrode 20 side. Here, the voltage is applied so that the first electrode 16 is positive.

When a voltage with this voltage value is applied to the first electrode 16 and the second electrode 20, the silver colloid particles 26B in the dimmer layer 30 move toward the second electrode 20 side, and thereby a state where the silver colloid particles 26A are dispersed in the dimmer layer 30 is observed (FIG. 1B). Thereby, in the display medium 10, a color (yellow) shown in a dispersed state of the silver colloid particles 26A is observed.

When a voltage with this voltage value is applied to the first electrode 16 and the second electrode 20, both the silver colloid particles 26B and the silver colloid particles 26A are observed to move toward the second electrode 20 side. Thereby, through a transparent insulating layer 18 and the first electrode 16, a color (white) of a white back substrate 14 appears and white is observed as the color of the display medium 10.

When an alternating voltage is applied to the first electrode 16 and the second electrode 20 of the display medium in a state that shows the color of the back substrate 14, the silver colloid particles 26B and the silver colloid particles 26A are returned to a dispersed state, and thereby a color (orange) obtained by adding the colors shown in the dispersed state of the silver colloid particles 26B and the silver colloid particles 26A is displayed.

What is claimed is:

1. A display medium comprising a dimmer layer which comprises at least two kinds of charged mobile fine particles, wherein each of the at least two kinds of the charged mobile fine particles respectively has different coloration and a different mobility, the charged mobile fine particles of at least one kind of the at least two kinds show coloration when in a dispersed state, and a difference in mobility between respective kinds of the at least two kinds of the charged mobile fine particles is approximately $1\times10^{-6}$ cm$^2$/Vs or more.

2. The display medium of claim 1, wherein respective kinds of the at least two kinds of the charged mobile fine particles show coloration of one of red, green and blue in a dispersed state.

3. The display medium of claim 1, wherein the charged mobile fine particles are dispersed in a polymer resin.

4. The display medium of claim 1, wherein the charged mobile fine particles that show coloration when in a dispersed state are metal colloidal particles having the color strength due to the surface plasmon resonance.

5. The display medium of claim 4, wherein the metal colloidal particles are gold colloids or silver colloids.

6. The display medium of claim 1, wherein the volume average diameter of the charged mobile fine particles is in a range of approximately 1 to 100 nm.

7. The display medium of claim 6, wherein the volume average diameter of the charged mobile fine particles is in a range of approximately 2 to 50 nm.

8. The display medium of claim 1, wherein a plurality of dimmer unit cells is layered on a rear substrate, and each of the plurality of dimmer unit cells comprises the dimmer layer.

9. The display medium of claim 1, wherein a plurality of dimmer unit cells are arranged in a direction along a plate face of a rear substrate, and each of the plurality of dimmer unit cells comprises the dimmer layer.

10. A display device comprising a dimmer layer and an electric field forming unit which forms an electric field in the dimmer layer, wherein the dimmer layer comprises at least two kinds of charged mobile fine particles, each of the at least two kinds of the charged mobile fine particles respectively has different coloration and a different mobility, the charged mobile fine particles of at least one kind of the at least two kinds show coloration when in a dispersed state, and a difference in mobility between respective kinds of the at least two kinds of the charged mobile fine particles is approximately $1\times10^{-6}$ cm$^2$/Vs or more.

11. The display device of claim 10, wherein the electric field forming unit forms an electric field in which an electric intensity of the electric field is controlled according to the kinds of the charged mobile fine particles.

12. The display device of claim 10, wherein the electric field forming unit comprises a pair of electrodes.

13. The display device of claim 12, wherein at least one electrode of the pair of electrodes is formed at a peripheral end portion of the dimmer layer.

14. The display device of claim 10, wherein respective kinds of the at least two kinds of the charged mobile fine particles show coloration of one of red, green or blue in a dispersed state.

15. The display device of claim 10, wherein the charged mobile fine particles are dispersed in a polymer resin.

16. The display device of claim 10, wherein the charged mobile fine particles that show coloration when in a dispersed state are metal colloidal particles having the color strength due to the surface plasmon resonance.

17. The display device of claim 16, wherein the metal colloidal particles are gold colloids or silver colloids.

18. The display device of claim 10, wherein the volume average diameter of the charged mobile fine particles is in a range of approximately 1 to 100 nm.

19. The display device of claim 10, wherein a plurality of dimmer unit cells is layered on a rear substrate, and each of the plurality of dimmer unit cells comprises the dimmer layer.

20. The display device of claim 10, wherein a plurality of dimmer unit cells are arranged in a direction along a plate face of a rear substrate, and each of the plurality of dimmer unit cells comprises the dimmer layer.

21. A display method comprising:
putting all charged mobile fine particles in a display medium comprising a dimmer layer comprising at least two kinds of the charged mobile fine particles in a dispersed state; and
keeping at least one kind of the at least two kinds of the charged mobile fine particles in a dispersed state and putting another kind of the at least two kinds of the charged mobile fine particles in a non-dispersed state,
wherein each of the at least two kinds of the charged mobile fine particles respectively has different coloration and a different mobility, and the charged mobile fine particles of at least one kind of the at least two kinds show coloration when in a dispersed state.

22. The display method of claim 21, further comprising putting all of the charged mobile fine particles in a non-dispersed state.

23. The display method of claim 21, wherein each of the at least two kinds of the charged mobile fine particles respectively shows different coloration when in a dispersed state.

* * * * *